United States Patent
McGinn et al.

(10) Patent No.: US 10,030,418 B2
(45) Date of Patent: *Jul. 24, 2018

(54) SHIELDED ELECTRONIC LOCK BOX

(71) Applicant: SentriLock, LLC, Cincinnati, OH (US)

(72) Inventors: Dennis McGinn, Palo Alto, CA (US); Suman Cherukuri, Cupertino, CA (US)

(73) Assignee: SentriLock, LLC, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/453,203

(22) Filed: Mar. 8, 2017

(65) Prior Publication Data

US 2017/0241165 A1 Aug. 24, 2017

Related U.S. Application Data

(63) Continuation of application No. 13/113,806, filed on May 23, 2011, which is a continuation of application
(Continued)

(51) Int. Cl.
*G06Q 10/00* (2012.01)
*G06Q 30/02* (2012.01)
(Continued)

(52) U.S. Cl.
CPC .......... *E05B 63/0065* (2013.01); *B60R 25/00* (2013.01); *E05B 19/0005* (2013.01);
(Continued)

(58) Field of Classification Search
CPC .............................. G06Q 10/00; G06Q 30/00
(Continued)

(56) References Cited

U.S. PATENT DOCUMENTS 3,599,454 A 8/1971 Hill et al.
3,695,067 A 10/1972 Bays
(Continued)

FOREIGN PATENT DOCUMENTS

DE 3908029 9/1990
EP 0366378 8/1993
(Continued)

OTHER PUBLICATIONS

Young, Stanley, No-Jacks, New High-tech Anticarjacking Gizmos Even James Bond Would Envy, Los Angeles, v. 38 Oct. 1993.
(Continued)

*Primary Examiner* — Sangeeta Bahl
(74) *Attorney, Agent, or Firm* — Frederick H. Gribbell

(57) ABSTRACT

Systems and methods are disclosed for maintaining security and data gathering for a number of vehicles. The systems include a vehicle activity module for each of the vehicles. The vehicle activity module has a wireless transmitter, a storage device, at least one sensor for receiving event information from identification devices, such as RFID cards, keypads, magnetic ID cards, and the like, a releasable key container, and a processor for accessing and analyzing information. The VAMs are wirelessly connected to a computer system. The VAMs control access to the keys, monitor information relating to access, and store and transmit information relating to sales events, non-sales events, and intrusion events. The VAMs are capable of autonomous operation, without the need to access the computer system to verify event information. The VAMs further include signal attenuating mechanisms to facilitate use of "smart keys."

27 Claims, 14 Drawing Sheets

Related U.S. Application Data

No. 11/703,829, filed on Feb. 8, 2007, now Pat. No. 7,949,541, which is a continuation-in-part of application No. 10/734,513, filed on Dec. 12, 2003, now Pat. No. 7,340,400.

(60) Provisional application No. 60/319,773, filed on Dec. 12, 2002.

(51) Int. Cl.
*E05B 63/00* (2006.01)
*G07C 9/00* (2006.01)
*B60R 25/00* (2013.01)
*E05B 19/00* (2006.01)
*E05B 65/00* (2006.01)
*E05B 49/00* (2006.01)
E05B 47/00 (2006.01)

(52) U.S. Cl.
CPC .......... *E05B 49/00* (2013.01); *E05B 65/0075* (2013.01); *G06Q 10/00* (2013.01); *G06Q 30/02* (2013.01); *G07C 9/00912* (2013.01); E05B 2047/0067 (2013.01); E05B 2047/0072 (2013.01)

(58) Field of Classification Search
USPC .......................................................... 705/1.1
See application file for complete search history.

(56) References Cited

U.S. PATENT DOCUMENTS

| | | |
|---|---|---|
| 3,742,741 A | 7/1973 | Cahan |
| 3,827,038 A | 7/1974 | Willis |
| 3,969,584 A | 7/1976 | Miller et al. |
| 4,112,421 A | 9/1978 | Freeny, Jr. |
| 4,148,012 A | 4/1979 | Baump et al. |
| 4,187,497 A | 2/1980 | Howell et al. |
| 4,209,787 A | 6/1980 | Freeny, Jr. |
| 4,217,588 A | 8/1980 | Freeny, Jr. |
| 4,218,763 A | 8/1980 | Kelley et al. |
| 4,631,358 A | 12/1986 | Newcome, III et al. |
| 4,636,950 A | 1/1987 | Caswell et al. |
| 4,673,932 A | 6/1987 | Ekchian et al. |
| 4,727,368 A | 2/1988 | Larson et al. |
| 4,808,993 A | 2/1989 | Clark |
| 4,838,052 A | 6/1989 | Williams et al. |
| 4,851,652 A | 7/1989 | Imran |
| 4,897,630 A | 1/1990 | Nykerk |
| 4,908,606 A | 3/1990 | Kevonian ..................... 340/571 |
| 4,914,732 A | 4/1990 | Henderson et al. |
| 4,916,443 A | 4/1990 | Barrett et al. |
| 4,988,987 A | 1/1991 | Barrett et al. |
| 5,231,273 A | 7/1993 | Caswell et al. |
| 5,245,652 A | 9/1993 | Larson et al. |
| 5,247,279 A | 9/1993 | Sato ........................ 340/426.17 |
| 5,280,518 A | 1/1994 | Danler et al. |
| 5,289,177 A | 2/1994 | Wake |
| 5,315,285 A | 5/1994 | Nykerk |
| 5,365,516 A | 11/1994 | Jandrell |
| 5,398,016 A | 3/1995 | Burayez |
| 5,463,371 A | 10/1995 | Fuller |
| 5,475,375 A | 12/1995 | Barrett et al. |
| 5,563,579 A | 10/1996 | Carter ........................... 340/539 |
| 5,602,536 A | 2/1997 | Henderson et al. |
| 5,612,668 A | 3/1997 | Scott |
| 5,815,557 A | 9/1998 | Larson |
| 6,104,309 A | 8/2000 | Ozawa |
| 6,472,973 B1 | 10/2002 | Harold et al. ............... 340/5.73 |
| 6,611,232 B1 | 8/2003 | Wunderlich et al. ......... 342/387 |
| 6,737,961 B2 | 5/2004 | Flick ........................ 340/426.35 |
| 6,758,788 B2 | 7/2004 | Itou .................................. 477/8 |
| 7,009,489 B2 | 3/2006 | Fisher ............................ 340/5.7 |
| 7,065,655 B1 | 6/2006 | Jakobsson ..................... 713/194 |
| 7,596,850 B2 | 10/2009 | Barth .............................. 29/594 |
| 2002/0044055 A1 | 4/2002 | Maloney ....................... 340/571 |
| 2002/0075154 A1 | 6/2002 | Maloney .................... 340/573.1 |
| 2002/0147981 A1 | 10/2002 | Ohta et al. ...................... 725/93 |
| 2003/0179075 A1 | 9/2003 | Greenman ................... 340/5.54 |
| 2004/0025039 A1 | 2/2004 | Kuenzi et al. ............... 713/193 |
| 2004/0095151 A1 | 5/2004 | Schmidt ........................ 324/686 |
| 2004/0160304 A1 | 8/2004 | Mosgrove et al. |
| 2007/0142103 A1 | 6/2007 | Livne ......................... 455/575.5 |

FOREIGN PATENT DOCUMENTS

| | | |
|---|---|---|
| GB | 2198270 | 6/1988 |
| GB | 2218243 | 8/1989 |
| GB | 2220778 | 1/1990 |
| JP | 06-097863 | 8/1994 |
| WO | WO 92/10387 | 6/1992 |
| WO | WO 93/12010 | 6/1993 |

OTHER PUBLICATIONS

Xu, Jintian, Multiple-purpose, Multiple-link Anti-theft Alarm, Electronic Engineering, v. 64 Nov. 1992.
Teitelman, Rovert, Digital Dragnet, Forbes, Nov. 4, 1985.
Mickadeit, Frank, Crime Ring; Police seek car thieves who batter walls of dealerships in heists, Apr. 23, 1992, The Orange County Register, METRO; p. B05, 3 pages.
Caristi, Anthony J., Build a Multi-Function Car Security System, Popular Electronics, v. 11 Oct. 1994, 9 pages.
GE Supra, GE Supra Announces New KeyAdvantage Electronic KeyBox System for Auto Dealership; Quick, Easy and Security Vehicle Access Enhances the Sales Process and Protects Dealer Assets, Supra Press Release, web print-out, Nov. 3, 2003; KeyAdvantage; GE Industrial web print-out, Aug. 12, 2004.

SHIELDED ELECTRONIC LOCK BOX

CROSS-REFERENCE TO RELATED APPLICATIONS

This application is a continuation of Ser. No. 13/113,806, filed May 23, 2011, which is a continuation of Ser. No. 11/703,829, filed Feb. 8, 2007 (now U.S. Pat. No. 7,949, 541), which is a continuation in part of Ser. No. 10/734,513, filed Dec. 12, 2003 (now U.S. Pat. No. 7,340,400), which claims priority to provisional application Ser. No. 60/319, 773, filed Dec. 12, 2002. The prior applications are hereby incorporated by reference as though fully set forth herein.

BACKGROUND OF THE INVENTION a. Field of the Invention

The present invention relates generally to a system and apparatus for monitoring activity in a fleet of vehicles for purposes of security, inventory control and management analysis.

b. Background Art

Car dealerships and other agencies that deal with large groups of vehicles must have a system for tracking and maintaining security in their vehicles, as well as being able to make projections of the interest by the public in varying types and models. This type of information is important for sales planning and ordering, and includes not only the sales of certain models, but information on how many test drives are taken, etc.

There are also problems that dealerships have in controlling the keys to their vehicles. It can be inconvenient for sales personnel to return to a central office and locate the keys to a certain vehicle when a customer is interested in driving it or perhaps merely viewing the interior and its accessories. There are thus obvious advantages to having the keys to vehicles kept with them so they may be easily accessed by sales personnel whenever they are needed. There are of course also the obvious dangers of keeping the keys with the car in terms of possible theft and vandalism.

In response to this need, there have been several attempts in the prior art to provide secure key boxes on the vehicles. U.S. Pat. No. 5,563,579 to Carter discloses a key storage device mounted to each vehicle window, which has a compartment for storing access keys. The storage device also has a sensing device which provides a signal to indicate whether an event is routine or hostile. A second device may be permanently attached to the vehicle for regularly transmitting identifying information as to that vehicle. Both devices report the information by radio through an intermediate transmitter network to a computer inside the dealership which records the information along with the time of the event. The information is stored for subsequent retrieval for the purpose of generating reports useful to the dealership management. If an event is hostile, appropriate action may be taken including suitable security alert signaling.

U.S. Pat. No. 6,611,232 to Wunderlich discloses a lock box unit mounted on a vehicle which includes a key box for storing a vehicle key and a locator unit. The locator unit receives a polling signal from a central base station which includes an address for the particular locator unit to be located. The location of the locator unit and the vehicle is determined based upon time arrival data generated by the receiving antennas. The lock box unit may also include an identification device, which records who accesses the key box to retrieve the vehicle key. This information is stored in a memory device.

Despite these advances, problems remain with the security of vehicles and the necessity for frequent replacement of batteries. Prior art systems such as Carter have used a pulse generator connected to the antenna doing a roll call to ask their boxes if they have a request or a problem to report. In this mode of operation, the boxes would always have to be "listening" and would render the idea of battery-powered modules useless, as the drain on the batteries would require them to be frequently serviced. As an alternative, they could be configured to power the box from the car battery, but this is also problematic in locating the box on the drivers' window and being able to remove it quickly with no wires.

In addition, it has been found that these earlier systems may be easily disabled by a moderate blows to the modules, and due to the nature of the alarm reporting, the damage may not be noticed immediately.

Another problem noted with existing systems is the lack of an ability to quickly and reliability locate particular automobiles on the lots. Existing systems have failed in this regard for a number of reasons. For example, existing products do not continually (1 to 5 minutes) receive signals from each vehicle to maintain its location position. Vehicles are moved regularly for cleaning, lot freshening, detail work, maintenance, sales demonstrations, employee use and so on. This creates issues for buyers today that commonly identify specific vehicles they are interested in seeing through online sites. Currently, it has been reported that 30% of the time in this situation, the desired vehicle can not be located. Additionally, systems that might use GPS or multiple radio antennas to triangulate the location of a vehicle are too expensive and require management that is additive to the burden of a VAM access control system which must be used continually for sales staff to access and sell vehicles.

Further complicating the use of earlier systems is the increasing presence of "smart keys" in the automobile industry. Many automobile manufacturers now offer vehicles with these "smart keys" that allow for operation of various vehicle functions so long as the key is within the proper proximity. These "smart keys" often interfere with the operation of earlier systems.

Thus, there is a need for a system which has effective and proactive security features, provides for reliable and accurate identification and location of the cars, and allows the use of battery powered devices that do not require frequent servicing.

BRIEF SUMMARY OF THE INVENTION

Accordingly, it is an object of the present invention to provide increased security for vehicles in a vehicle fleet system which includes the bright flashing of a very visible red LED on all vehicles at regular intervals and any time the VAM module is disturbed when not temporarily suspended by valid access event.

Another object of the invention is to enable automatic alerting of designated individuals by internet/email/cell phone when there is a security violation.

And another object of the invention is to provide and integrated and self sustaining power system in each module which requires less servicing than prior systems.

A further object of the invention is to provide VAM's which exist in a light sleep mode with the ability to react in milliseconds to any interrupt (disturbance/request for access).

An additional object of the present invention is to provide a security system in which each VAM asks for attention when needed including waking up at programmed (and controllable) intervals such as every 30 minutes during business hours and every 5 minutes at night so that there is an AWOL/MIA default to generate an alert.

A further object of the present invention is to provide a plurality of VAMs, in which each VAM is capable of autonomous operation for extended periods of time, including storage of event information relating to access, employees, location, and the like within the VAM itself such that any network interruption or down-time of the system as a whole does not affect the operation or security of the individual VAM units.

A yet further object of the present invention is to provide a system where information such as frequency of VAM access, customer information, and the like can be entered directly into the VAM itself and are further used to generate reports, which can be used for inventory planning, sales strategies, and management decisions.

An additional object of the present invention is to provide for "smart keys" to be managed by the VAM in addition to traditional and basic remote entry keys.

A further object of the present invention is to allow users to access any VAM equipped vehicle at any location, which can be remote to the dealer site. Each VAM is updated daily and wirelessly so that all authorized individuals are known to the VAM at any time and in any location. Accesses are tracked and reported automatically to the central system once the vehicle is returned to the dealer's Wireless equipped lot. This allows the VAM to be used in any location according to dealer policy.

An additional object of this invention is to wirelessly locate any VAM equipped vehicle while on the dealer's lot for customer showings, real-time inventory tracking, and vehicle inventory security. Vehicles that are VAM equipped and are temporarily located away from the dealership, will be prompted, and required to be signed out by manager for security and tracking. Any authorized person can locate a specific vehicle by inputting the stock number or other description into any internet attached PC independent of location.

A further object of this invention is to provide daily reporting of all vehicles that are in being re-conditioned and/or certified which are not yet available for sale.

An additional object of this invention is to provide the option for additional security of each vehicle by installing a wireless vehicle identification device in said vehicle which continually identifies said vehicle to each VAM. This device would be a miniature, battery powered device, which continuously signals the identity of said vehicle to its paired VAM. Each time the VAM communicates with the wireless radio on the lot, it would also communicate with the identification device to insure that said VAM is located proximal to said vehicle. This wireless identification device further may prevent the vehicle from starting by disabling said vehicle, e.g., by using a starter relay unless VAM is properly accessed by an authorized person.

An advantage of the present invention is that access to keys granted or denied in real time.

Another advantage of the present invention is that access is locked out after hours except for master cards.

And another advantage of the present invention is that all users are identified and tracked.

A further advantage of the present invention is that the access key is electronic (RFID) and encrypted to avoid copying.

A yet further advantage is that each key set also has an RFID tag attached for completely unique identity tracking with each access and return Another advantage is that the power source is always available and independent, and provides regulated power to keep the electronics operational.

A further advantage is that rechargeable batteries provide a renewable energy source with daily solar re-charge of the battery pack, and battery strength is reported periodically for advanced notice if a battery is failing. Battery packs are easily replaceable by the dealer.

Another advantage is that the present system provides wireless tampering alerts in real time.

And another advantage is that the present system sends a vehicle specific alert (by vehicle description & VIN) immediately to a dealer designated security surveillance center. The same information can be also be sent immediately to cell phone(s) as an urgent message or by e-mail.

A yet further advantage is that VAM units which are still checked in but not reporting in at regular (5 minute) time interval will generate an immediate alarm as a fail safe.

Briefly, one preferred embodiment of the present invention is a system for maintaining security and data gathering for a number of vehicles. The system includes a vehicle activity module for each of the vehicles, the vehicle activity module including a wireless transmitter, at least one ID reader, activity sensors, and a central computer having a database for data storage, the central computer being in wireless communication with each of the vehicle activity modules. The system also includes key ID tags, which are attached to vehicle keys, and personal ID cards which are issued to sales, maintenance and service personnel. Information is read from personal ID cards and key ID tags attached to keys by the activity sensors, and is transmitted to the central computer for authorization of access and recording of access activity, and for storage and analysis.

Also disclosed are VAMs, and methods for collecting and analyzing data on vehicle access, and for maintaining security for a plurality of vehicles.

The present invention further provides a key management device for storing at least one key proximate a vehicle, maintaining security, and gathering data for the vehicle having a housing having a releasable key compartment; and a signal attenuating device being capable of attenuating a wireless signal emitted from the at least one key. The signal attenuating device may include a conductive container configured to fit within the releasable key compartment that attenuates a wireless signal from the key when it is disposed within the conductive container. In another embodiment, the conductive container may be integral to the device.

The key management device may also include an identification tag, e.g., a RFID tag, containing vehicle information attached to and associated with the at least one key or the conductive container. In addition, the key management device may further include at least one information reader, or sensor, by which event information can be input into the device, and a storage device operably connected to the information reader for receipt and storage of event information. The event information may include any, or all, of the following: identification information (such as employee name, user ID), access information (such as a pin number), key information, customer information (such as a telephone number), location information, sales information, and intrusion information. The information reader may include a magnetic card reader, a RFID reader, a keypad, a biometric reader, or combinations thereof.

The key management device may be operably connected to the computer via a wireless transmitter (which may be configured to communicate via a cellular communications facility or through a Zigbee wireless network protocol. The information reader may be integral, or removably connected, to the device.

The key management device may further include an event action mechanism, such as a release mechanism for the releasable key compartment, an intrusion alarm, an LED display, a digital display, or a data transfer mechanism capable of transmitting information to the computer via the wireless transmitter. Upon verification of reference information with corresponding event information, an event action mechanism may be activated.

The present invention also includes a system for maintaining security and gathering data for a plurality of vehicles. The system includes a plurality of VAMs. Each VAM may be assigned to one of a plurality of vehicles. The VAMs further include a storage device, a wireless transmitter, at least one sensor, a releasable key container configured to receive at least one key, and a processor operably coupled to one or more of the wireless transmitter, at least one sensor, or releasable key container. The VAMs are operably connected to a computer having a database for storage of data, the computer being in wireless communication with the at least one vehicle activity module. The system further includes at least one key identification device for attachment to the at least one key of at least one of the plurality of vehicles, and at least one identification card containing information relating to an individual authorized to access at least one of the VAMs. The system may further include a clock within the VAM, allowing for transmission of information from the VAM to the computer related to the clock.

The processor is capable of receiving and transmitting event information to the storage device or the computer from at least one of the sensors, and is programmed to access and analyze the event information and compare it to reference information stored in the VAM for initiation of an event action within the VAM.

The computer periodically transmits reference information to the VAMs independent of the event information and the reference information may be used by at least one of the VAMs to analyze event information.

In accordance with another embodiment of the invention, at least one sensor senses the presence or absence of at least one key identification device within the releasable key container and the VAM transmits information relating to the presence or absence of a key identification device. The sensors may be one, or a combination of a magnetic card reader, an RFID reader, a programmable key pad, a biometric reader, or a motion sensing mechanism.

In accordance with another embodiment, the event action may be any of the following actions: triggering an alarm, releasing the releasable key container, transmitting the event information to the computer, or combinations thereof.

The VAM of the systems in accordance with the present invention further include a rechargeable battery, which preferably is a solar powered rechargeable battery.

The wireless transmitter of the systems is configured to communicate with the computer through a cellular communications facility, or through a Zigbee wireless network protocol.

The systems of the present invention further provide for transmission of the event information from the VAM to the computer for storage in the database and for generation of reports relating to the event information. The computer is configurable to generate reports relating to inventory based on the event information, such as reports for locating at least one of the plurality of vehicle based on the event information, reports relating to the presence or absence of at least one of the keys of the plurality of vehicles based on the event information, reports relating to access to at least one of the plurality of vehicles based on the event information, and reports relating to attempts to access at least one of the plurality of vehicles.

In accordance with yet another embodiment of the present invention, a method for managing and recording event information pertaining to access to a plurality of vehicles is provided including the steps of: (i) assigning one of a plurality of VAMs to one of a plurality of vehicles; (ii) assigning a key identification number to a key for the assigned vehicle, the key identification number containing information that permits a cross-reference to the assigned vehicle; (iii) providing at least one identification card containing information relating to an individual authorized to access at least one VAM; (iv) connecting a computer having a database for data storage in wireless communication with the at least one VAM, the computer being configured to send and receive information to and from the at least one VAM; (v) sensing an event from at least one of the plurality of VAMs; (vi) processing information relating to the sensed event with information contained within the VAM; and (vii) establishing a wireless communication link between the plurality of vehicle activity modules and a computer, such that the activated vehicle activity module is capable of transmitting the processed information to the computer relating to the sensed event. The step of assigning a key identification number may include attaching a key identification device to the key.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
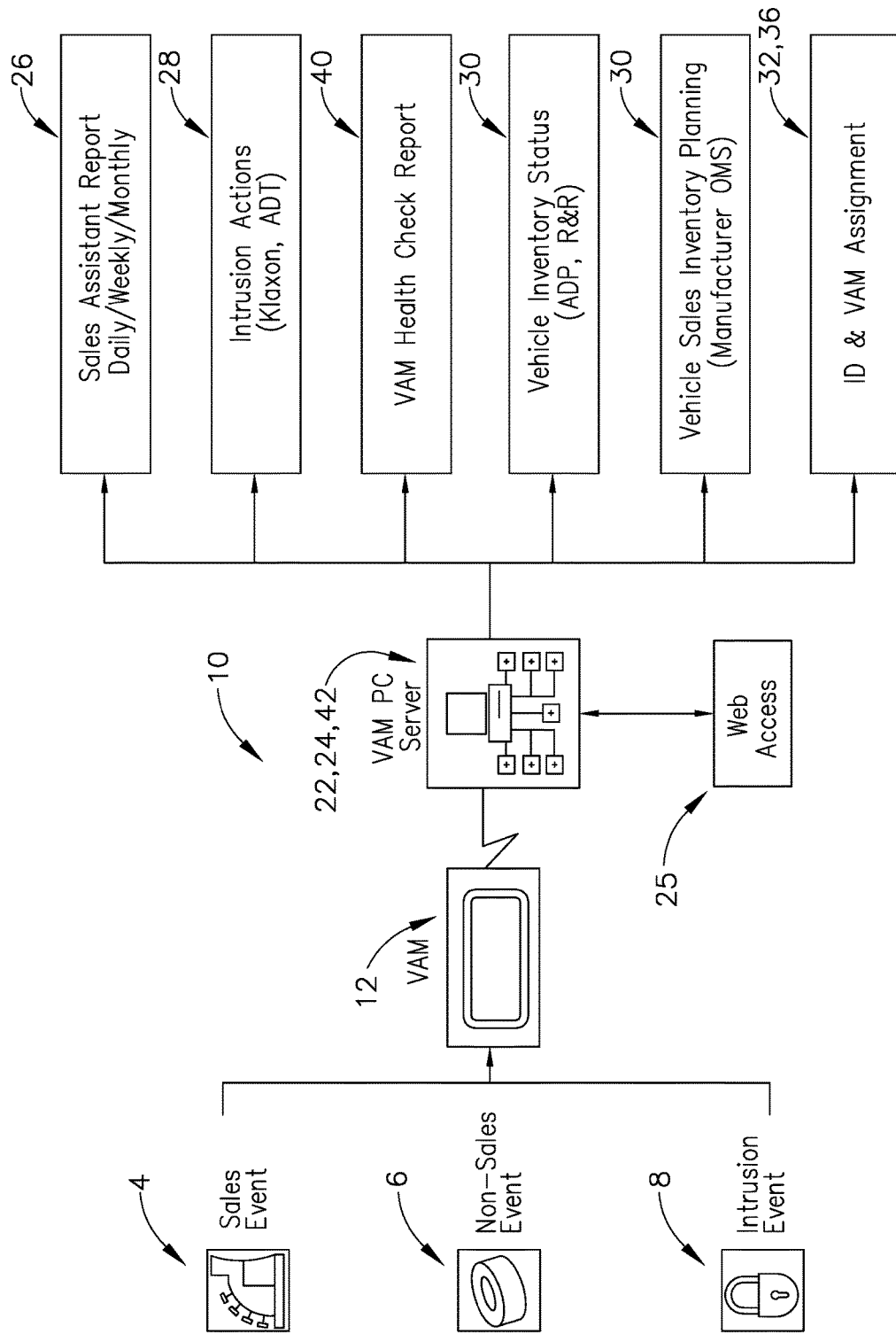
FIG. 1 shows a diagram of the basic functional elements of the system and apparatus of the present invention.
Figure 2:
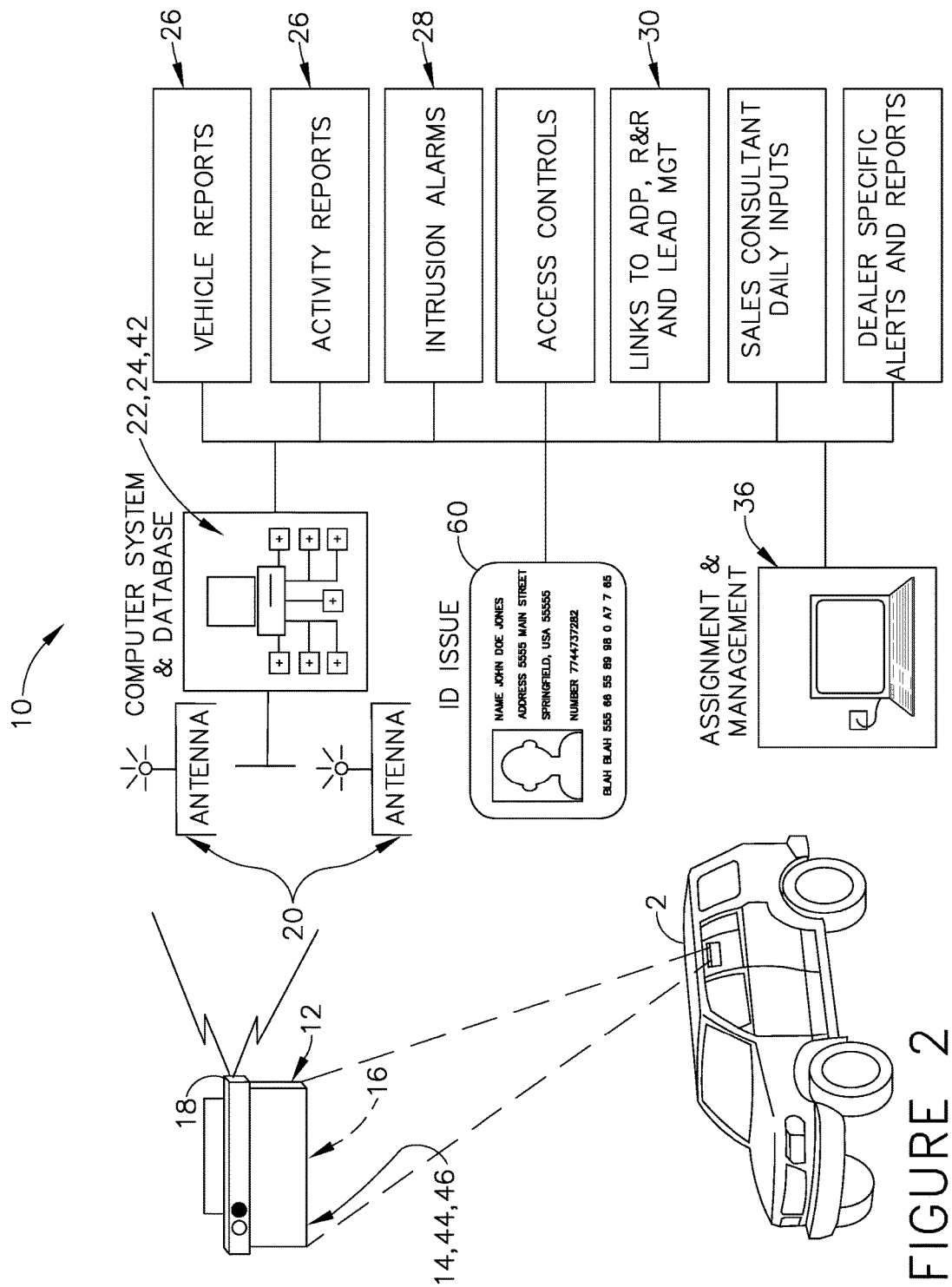
FIG. 2 shows a diagram of the basic physical architecture of the system and apparatus of the present invention.

FIGS. 1 and 2 shows the functional embodiment, and physical interrelations of the vehicle activity monitoring system 10 as applied to optimizing vehicle sales. In basic terms, this system 10 includes vehicle activity modules (VAM) 12, mounted on vehicles 2, which accept data from or indicating various types of events, such as sales events 4, non-sales events 6 and intrusion events 8. The VAM 12 includes a lock box or key container 14 including keys sets 16 and a transmitter or wireless link 18 which relays various information to one or more antennae 20 connected to a central computer 22 containing a database 24. The data in this database 24 is then capable of being sorted and queried to produce various reports 26 or to initiate alarms 28 or to provide information for manufacturing orders 30.

FIG. 2 shows the physical embodiment of the invention 10 as applied to a dealer location. Every vehicle 2 in on the dealer lot will have a uniquely identified VAM Every VAM 12 is assigned by vehicle VIN number and stock number, when first introduced into sales inventory. The assigned VAM 12 will stay with the assigned vehicle 2 until the vehicle 2 is sold or otherwise removed from inventory. The VAM 12 will communicate to the database 24 on a PC 22 inside the dealer facility through standard wireless high gain antennas 20 located typically on the roof of the dealership. These antennas 20 will be installed in sufficient locations so that the VAMs 12 will be able to connect from any open space on the dealer lot. The antennas 20 will typically be wired directly to the central PC 22 except where a remote lot is part of the dealer system. In this mode of operation, some relay technology will be added to get the signal to the central PC 22. This PC 22 will serve as the collector of the event data and deposit this into a database 24 residing on the PC 22. The PC system 22 will also be the processing center for all VAM data collection and for outputs that include but are not restricted to, event reports 26, ID issue 60, authorization control and VAM assignments 36 to each vehicle 2.

In addition to standard high gain antennas, the present invention preferably contemplates use of the Zigbee wireless network protocol, and alternatively a cellular connection such as those offered by Digi International or MultiTech Systems. The Zigbee protocol is particularly preferred because it is a highly energy efficient protocol that utilizes low data rates so as not to interfere with other wireless technologies like Bluetooth and 802.11 wi-fi. Use of this protocol saves significantly on costs and energy expenditures. The cellular protocol is also a preferable connection because it enables monitoring, transfer of information, storage of information and similar benefits to be conducted not through a central PC at the site, but rather from any remote location. This remote capability provides for the further benefit of prompt transfer of data from a number of different sites to a single location for storage, analysis, reporting and the like.

VAM status reporting is also provided for along with the daily inventory of all vehicles so that rechargeable battery packs 38 (see FIG. 5 below) does not drop below a minimum threshold before being recharged. This reporting is called the VAM health check 40 (FIG. 1) and in addition to the battery status, will also signal any error problems detected by the VAM self contained diagnosis software 42. Web access 25 is also provided through which individuals can check status, access reports or be alerted to alarms or key events.

Figure 3:
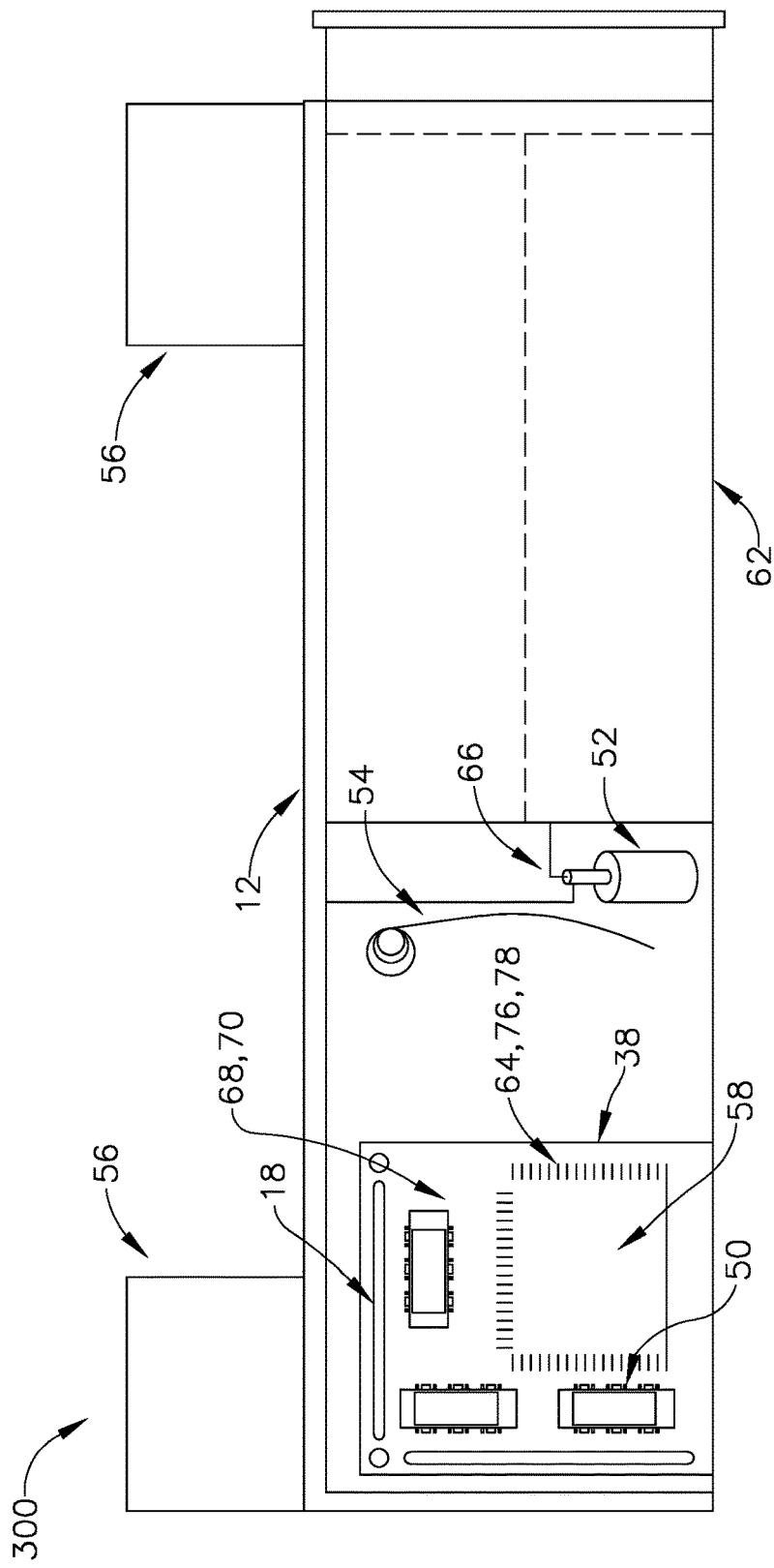
FIG. 3 shows a diagram of the basic electronic components of the vehicle activity module of the present invention.
Figure 4:
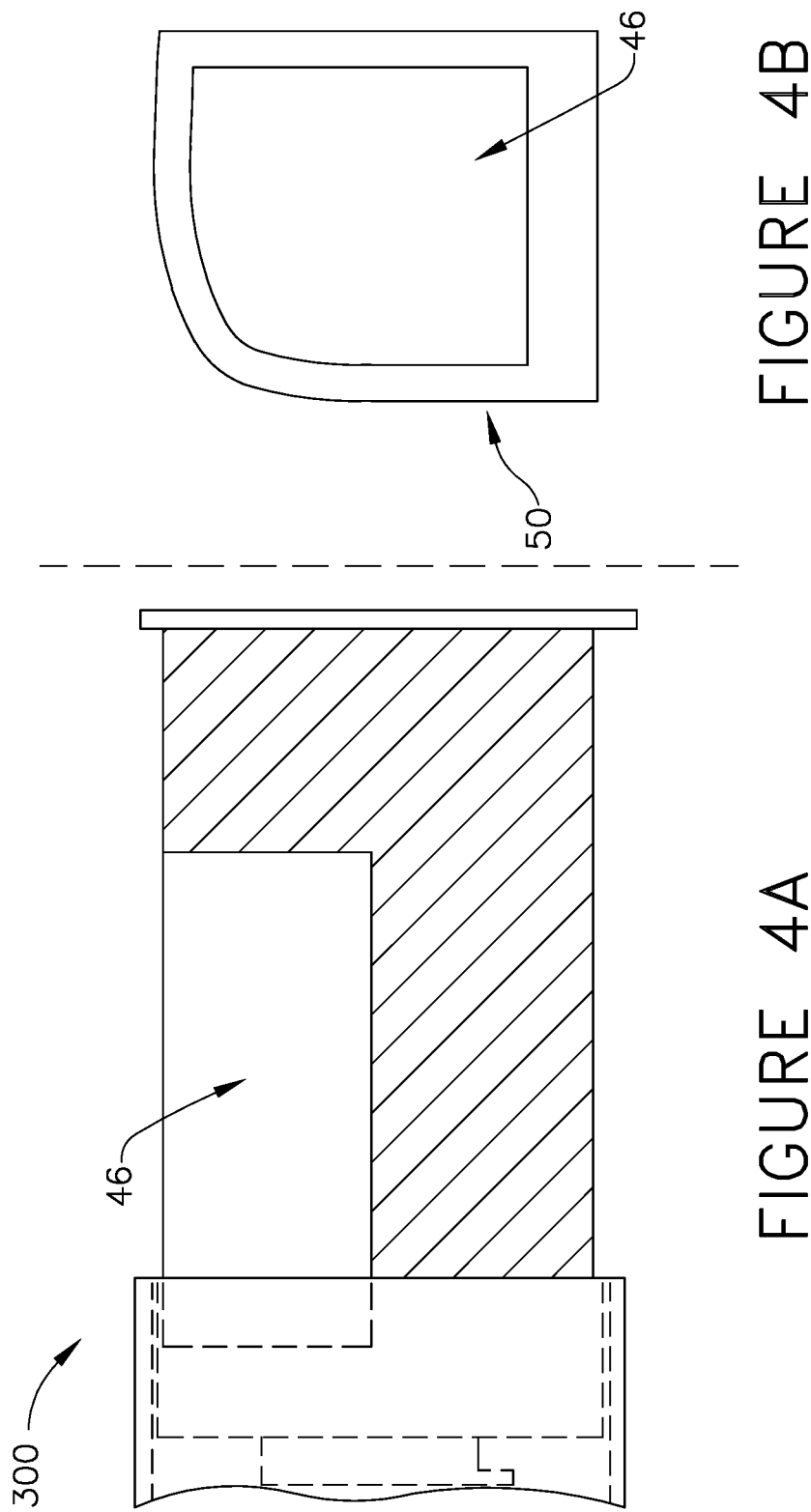
FIGS. 4 A and B show side plan views and end plan views of the vehicle activity module of the present invention in an open position.
Figure 5:
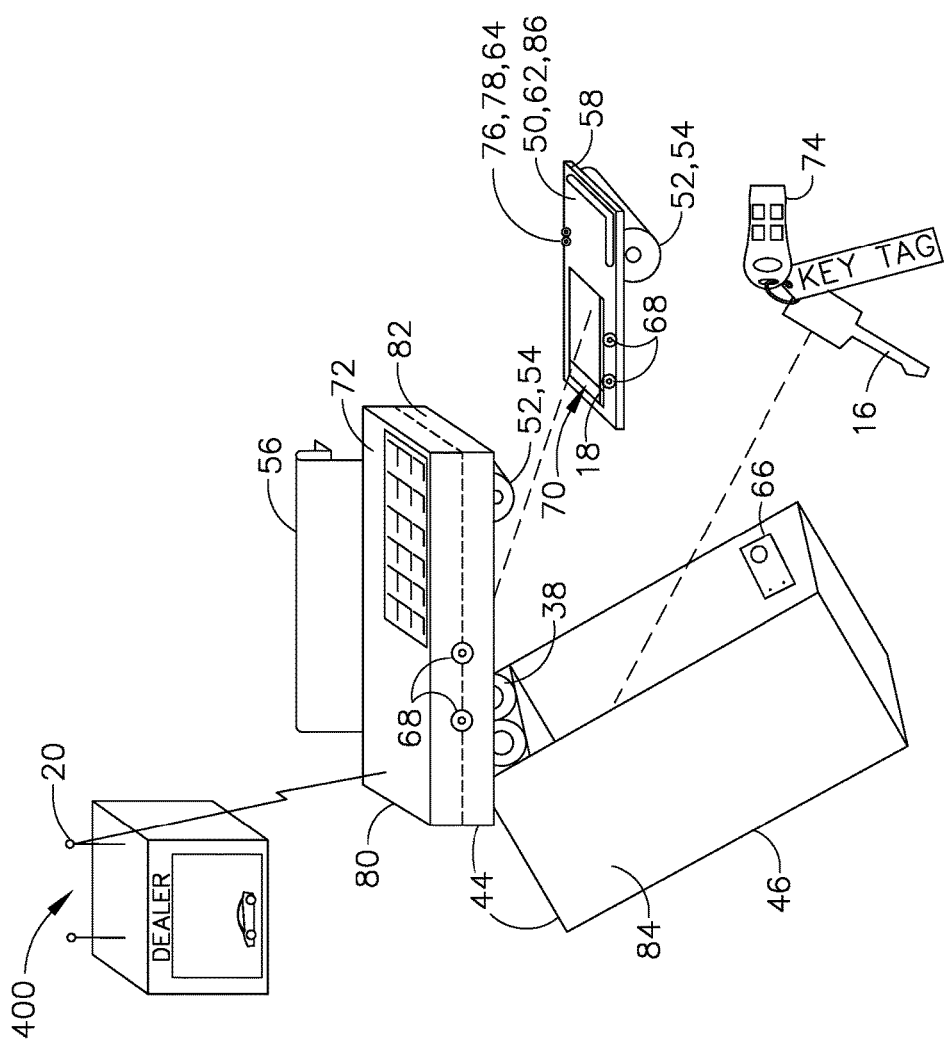
FIG. 5 shows a perspective view of a vehicle activity module of the present invention in open position.
Figure 6:
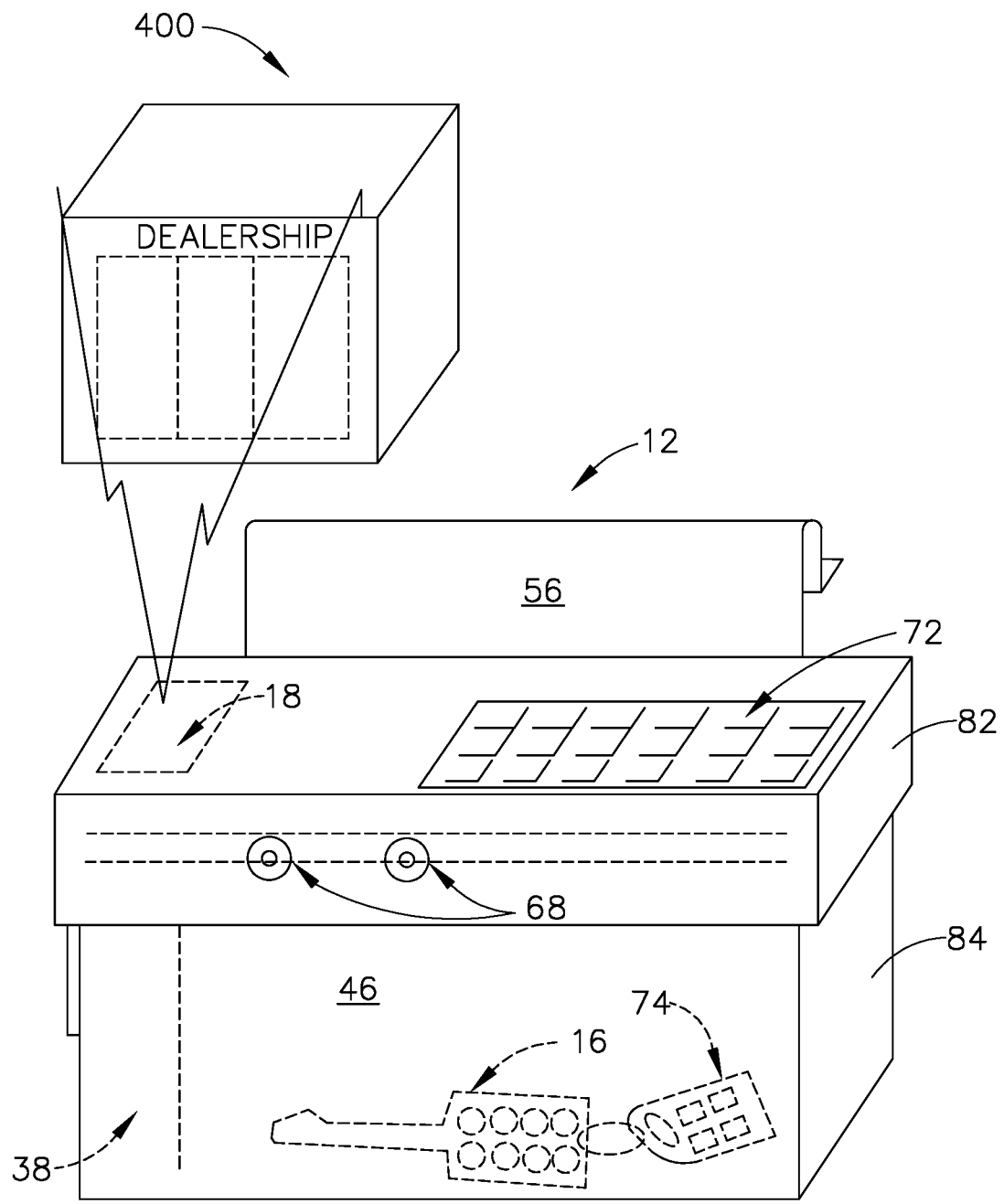
FIG. 6 shows a perspective view of a vehicle activity module of the present invention in open position.

FIGS. 3 and 4A and B show a first embodiment of the present invention, in which the key container 46 is configured as a sliding drawer with a magnetic card reader for reading ID cards. FIGS. 5 and 6 shows a second embodiment in which the key container 46 is configured as a box with a hinged top, which has been equipped with an RFID reader which can read both a personal ID card 60 and the ID tag 74 which is attached to the vehicle key at any time in which the key container 46 is opened or closed. Where elements are configured similarly, or perform the same function, they will be designated by the same element number in both embodiments, so that for instance, a card reader 50 will refer to both a magnetic card reader and an RFID reader.

FIGS. 3-6 show the physical internals of the VAM 12. The VAM 12 consists of three major components; the VAM housing 44, the key container module 46, and the systems board electronics module 58. Included in the VAM housing 44 is an ID reader 50, which could be a magnetic strip reader or preferably an RFID reader, a release solenoid 52 and a release spring system 54, and the stainless steel window straps 56, which will be recessed into the back and under the body of the VAM housing 44. The VAM housing 44 material is preferably high impact injection molded PVC with an metal or synthetic key chamber. The use of a non-metal material for the VAM top cover of the housing 44 allows the wireless signal to reach the antenna 20 in either direction, through the car or away from the vehicle, making the VAM 12 more difficult to defeat. The weight and shape of each VAM makes it easy to open and to physically handle.

The third component of the VAM 12 is the electronics module 48 containing the electronics circuit board 58 which is mounted in a panel that can be removed for repair by a VAM repair depot. This circuit board 58 is custom manufactured to high quality standards using all standard off the shelf cost effective components.

Referring now also to FIGS. 1 and 2, with the reading of a valid ID card 60, the ID 60 is validated in the PC database 24 in the dealership, through the wireless link 18. This validation process typically would take a few seconds. Once the validation is received, the key container 46 is released so that the sales consultant or other users can remove the key 16 for access to the vehicle 2. In a sales event 4, the interested customer will be given immediate access to the vehicle 2. If the customer decides to test drive the vehicle 2, the sales consultant would simply check the customers drivers license and then take customer off of the lot in the vehicle. When the vehicle 2 exits the lot, the wireless system 18 records that this vehicle is now absent but is still in an open sales event. The VAM 12 then records this as a demo drive attributed to the respective sales consultant, and records the elapsed time the vehicle 2 is out off the lot Upon completion of any sales event 4, the key 16 will be replaced in the VAM 12 and the key container 46 closed. All the relevant data is added to the sales event for subsequent management follow-up and sales reporting.

Any open event must be terminated by the key replacement as verified by a key presence sensor 62 and container closure sensor 64.

FIG. 4A shows the VAM key container 46 in the fully open position and also a view of the VAM 12 from the right side when closed in FIG. 4B.

FIGS. 5 and 6 show the VAM 12, with the key container 46 in open position and closed positions, respectively. The VAM 44 housing consists of a top cover 82 which also houses the electronic system board 58 and the housing bottom 84 which includes the key container 46. The latch mechanism 66 is visible in FIG. 5, along with a set of LEDs 68 which indicate status. The wireless transmitter 18 is located on the circuit board and is generally in the top front left area just under the cover 82. The circuit board 58 is shown in dashed lines. An intrusion sensor 70 is also located on the circuit board 58 as shown. The battery pack 38 is located below the circuit board 58 in the left end of the key chamber 46. In order to help keep the rechargeable battery pack 38 fully charged, a high efficiency solar panel 72 is permanently installed in the top 82 which provides the batteries 38 with a trickle charge during daylight hours.

The electronic system board 58 is a single circuit board located horizontally inside the top 82 of the VAM 12. In FIG. 5, the system board 58 is directly behind the LEDs 68, and extends almost the full length and width of the top cover 82. The key presence sensor 62 and ID sensor 50 antenna consists of 2 loops of wire that run around the outside edge of the system board 58.

An important feature of the system is the Key Tag function. Each vehicle key set 16 has a small RFID key ID tag 74 attached by a metal wire loop. This key ID tag 74 is a "smart tag" that transmits a unique ID code in the presence the correct sensor. These key ID tags 74 will be "read" electronically each time the VAM 12 is accessed and again when closed by the key presence sensor 62. The purpose of this key ID tag 74 is to identify that upon each access there is a key set 16 in the VAM 12 and that it is the correct key set 16.

The key ID tag 74 is typically assigned to a key set 16 (often including a smart key and a signal attenuating container) and a VAM 12 by an administrative person at the time a vehicle 2 is placed in inventory. This is accomplished quickly since the vehicle descriptions such as model, color and VIN number are automatically loaded into the server 22 each night from the dealer management system. The key tag ID 74 is sensed or read by a key presence sensor 62 on the main system board 58 in each VAM 12, so long as the tag 74 is in the VAM key container 46. The key presence sensor 62 is a custom designed circuit that is built to read the key tag 74 and also the user ID card 60, with one common circuit, and to recognize and read both the key tag 74 and the ID card 60 at the same time, thus it is appropriate to refer to the key tag/ID sensor 86. The sensor circuit 62 is built into and encircles the electronics on the single systems board 58. It sits over and only a few inches above the key tag 74 when in place in the VAM 12.

Another important feature is the key chamber position switches 76 function. There are two micro switches 78 mounted on the system board 58 to detect whether the key chamber 46 is now open or shut, and whether there is an immediate request to access the VAM 12 or to close an event since the keys 16 have just returned. The two key chamber position switches 78 are located inside the VAM 12 and at the back of the VAM 12. The system board 58 is mounted horizontally inside an injection molded top section 80. When viewing a VAM 12 on a drivers side window, the switches 78 are mounted underneath and at the back of the system board 58 such that when the key chamber 46 is closed, it contacts these two switches 78 at the point at which the solenoid latch 66 engages. One switch serves as a 'key chamber closed' indicator and the second serves as a request to wake-up and/or open indicator.

The VAM 12 is also equipped with an intrusion sensor 70. The function of the intrusion sensor 70 is to send an alert to dealership security that is based on the level and type of disturbance. This sensor 70 or "disturbance switch" is designed for automotive and military defense applications. The intrusion sensor 70 is a small inconspicuous device located on the system board 58 alongside other electronic components. This intrusion sensor 70 is calibrated to detect random disturbances in a horizontal plane and also detects abnormal tilt motion. Each dealership will be able to choose the level of sensitivity that they want from their VAM 12 units. This is important since some geographic areas have more theft and vandalism problems and lack of detection is a driving problem. The alerts are disabled when there is a valid event underway. Also, the RED LED's 68 would typically be used as a visual warning by blinking brightly from time to time and also will react when disturbed during the times the dealership is open. After hours, the LED's also acts as a deterrent by all VAM's randomly flashing their RED LED's every few minutes. Any detected intrusion would send a watch alert or a full alert to the dealer's security service depending on the severity of the disturbance. In this way, some heavy weather caused disturbances can be differentiated from an actual intrusion or attempted intrusion.

In addition to security alarms activated by disturbances, each VAM 12 asks for attention when needed including waking up at programmed (and controllable) intervals such as every 30 minutes during business hours and every 5 minutes at night so we have an AWOL/MIA fall back to generate an alert.

By applying the information deposited in the database 24 from the VAMs 12 along with the dealer's experience, an objective of continuously increasing inventory turns and profitability is supported by the extension recorded and organized event data.

Figure 7:
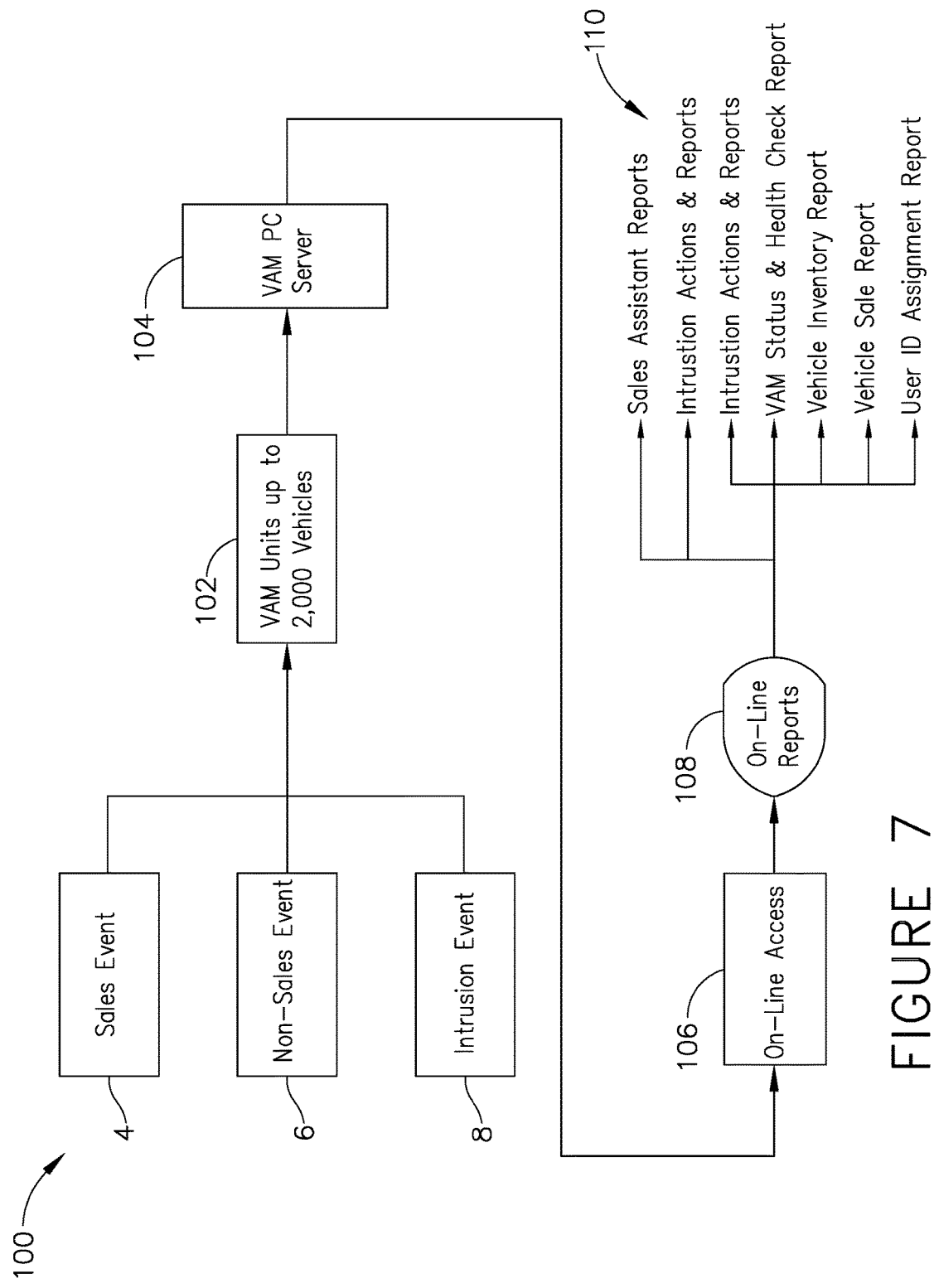
FIG. 7 illustrates a flow chart showing the overall functional view of the operation of the system and apparatus of the present invention.

As mentioned above, there will be at least three types of events enabled by the present system 10. Flow charts are shown for each of these three event types in FIGS. 8-10, as well as for a general functional view 100 of event detection in FIG. 7. FIGS. 1-6 are also referenced for some physical elements discussed in conjunction with the flowcharts.

Generally, the three events 4, 6, and 8 are detected by any of the VAM units 12 which are included in up to 2,000 vehicles 102. This information is relayed to the VAM PC server 104, which is equipped with on-line access 106. On-line requests can be used to generate on-line reports 108 such as sales assistant reports, intrusion actions and reports, VAM status and health checks, vehicle inventories, sales and user ID assignment reports, noted as a group as 110.

The database 24 has been designed for maximum flexibility with the supplied screens and for any custom reports the dealer wants to use. Reports can be sent on a scheduled basis by email, and can also be accesses on-line by authorized individuals. Reports are delivered in MS Excel format.

Reports such as the "missing vehicle" report will quickly find all vehicles not properly checked out, missing or not available for sale. Any detected disturbance of the lockbox will send out an alert/alarm to a security company/dealer general manager. This feature will likely be used as a visual disturbance warning (RED LED) in the day and send alerts by internet and/or cell phone message. By example: Intrusion alert: HIGH for Red Corvette, north lot VIN123456789, and ON STAR equipped.

Figure 8:
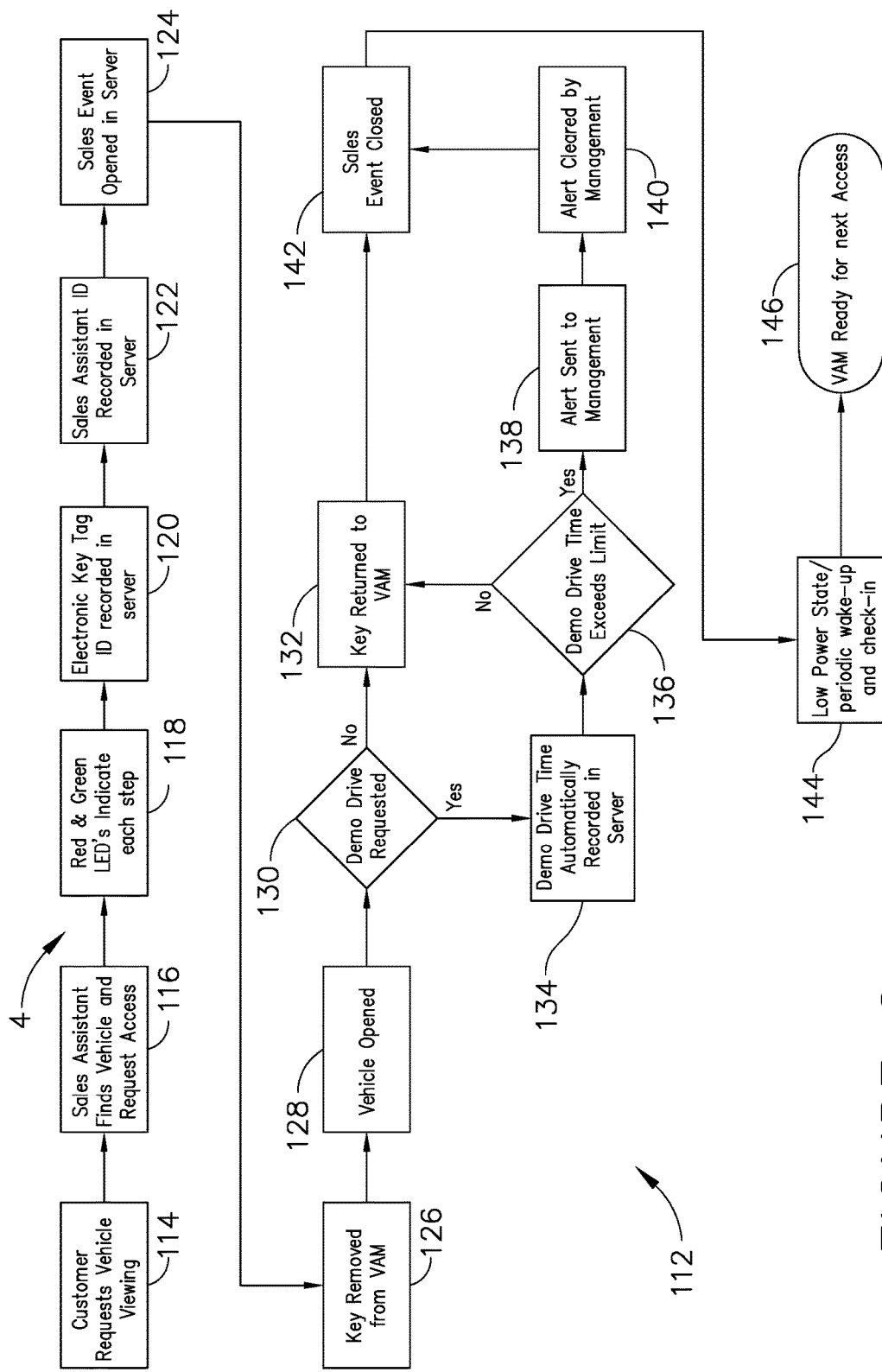
FIG. 8 illustrates a flow chart showing the operation of the system and apparatus of the present invention during a non-sales event.

FIG. 8 shows a flow chart 112 for a sales event 4. A sales event 4 is initiated when a customer requests a viewing 114. The Sales Assistant is assumed to have been issued an appropriate ID card 60. He finds the vehicle 2 and requests access by scanning his ID card 60 through the reader 116. Red and green LEDs 68 indicate each step of the process 118, and the electronic key tag ID 74 is read and recorded in the central computer 120, along with the Sales Assistant's ID 122. A sales event 4 is opened in the server 124, and access is granted to the vehicle 2 as the key 16 is removed for the key container 126. The vehicle is opened 128 for inspection and the customer is asked whether she wants a test drive 130. If the answer is no, the key is returned to the key container 132 and the sales event is closed 142. If the answer is yes, the demo drive time is automatically recorded in the server 134. A determination whether the drive time limit exceeds a permitted limit 136. If not, the key is returned to the key container 132 and the sales event is closed 142. If the limit is exceeded, an alert is sent to management 138, which must be cleared 140 before the sales event is closed 142. If the alert is not cleared, an alarm may be sounded or security or police agencies notified.

The VAM 12 is programmed to periodically wake-up and check in 144 at programmed (and controllable) intervals such as every 30 minutes during business hours and every 5 minutes at night so there is an AWOL/MIA fall back to generate an alert. The VAM is then ready for the next access 146.

Figure 9:
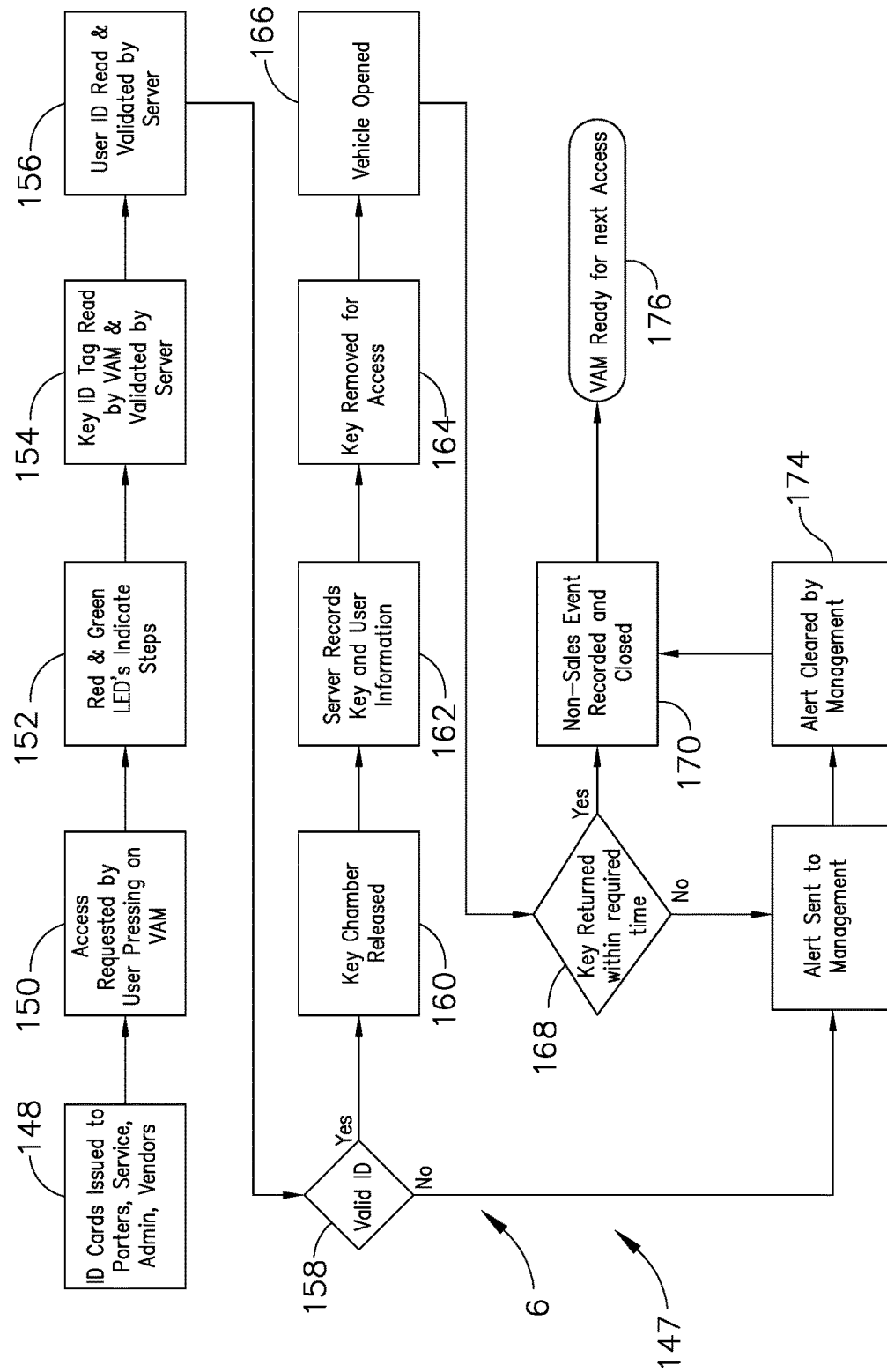
FIG. 9 illustrates a flow chart showing the operation of the system and apparatus of the present invention during a sales event.

FIG. 9 shows a flow chart 147 for non-sales events 6. ID cards 60 are issued to porters, service personnel, administrators, and vendors 148 who might have need for access to the vehicles. Access is requested by one of these personnel by pressing on the VAM 150 key container 46 chamber with a slight upward motion on the right side. This activates the 'request for wake-up' and service switch. LEDs 68 again indicate steps 152. The key ID tag 74 is read by the VAM 12 and validated by the server 154. The user ID 60 is read and validated by the server 156. If the ID is valid 158, the key chamber 46 is now available to open with a second slight upward motion again on the right end. This will now activate the unlocking solenoid 52 and the key chamber 46 will swing down and expose the vehicle key set 160 The server records Key and User ID information 162, the key 16 is removed 164 from the key container 46, and the vehicle 2 is opened 166. The time that the vehicle is opened is recorded and later it is determined if the key is not returned within the time limit designated by the dealer as the 'maximum demo/key missing time' 168. If "yes", the key is returned to the key container, and the non-sales event is recorded and closed 170. If the limit is exceeded, an alert is sent to management 172, which must be cleared 174 before the non-sales event is recorded and closed 170. The VAM is then ready for the next access 176. If the alert is not cleared, an alarm may be sounded or security or police agencies notified.

Figure 10:
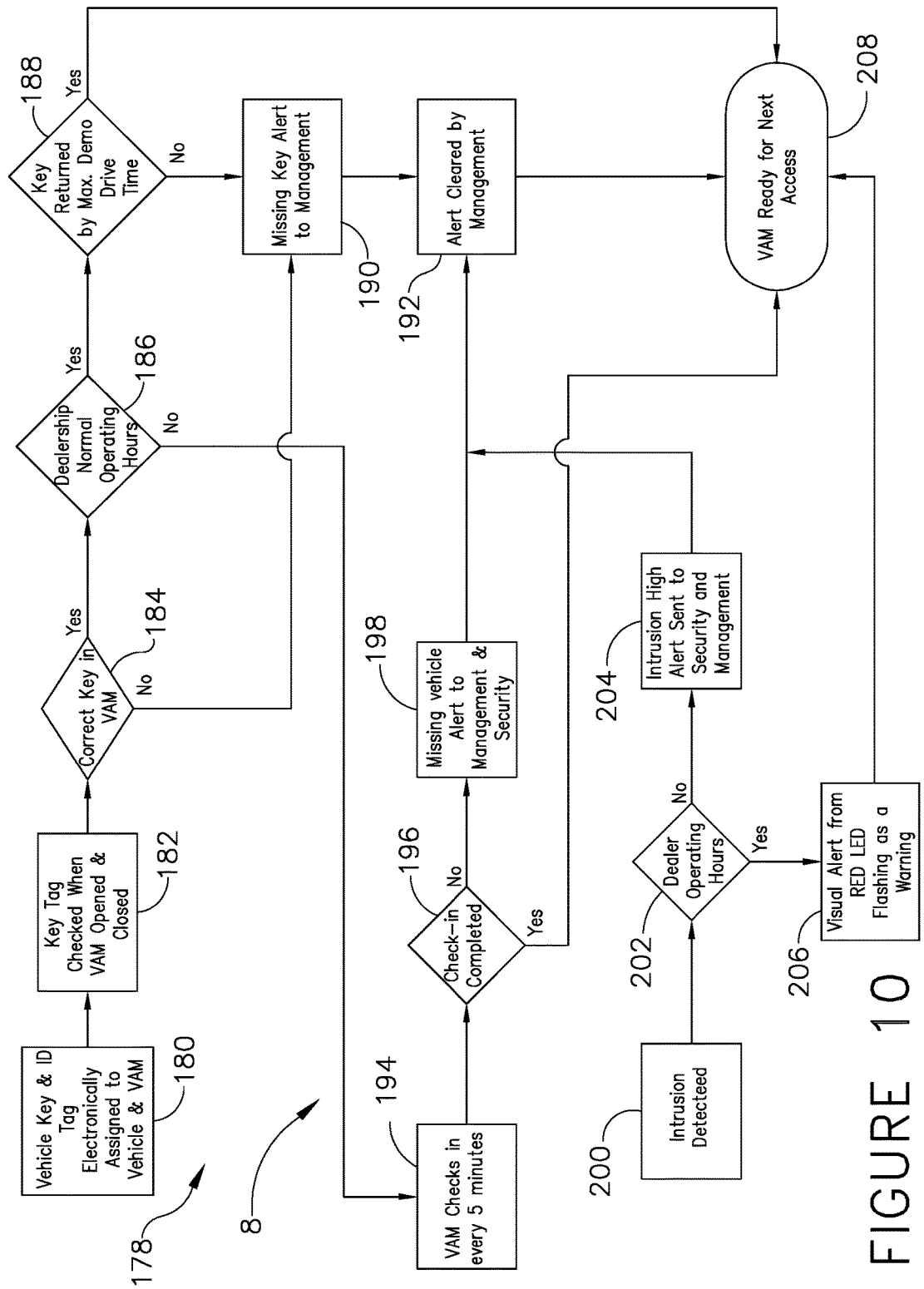
FIG. 10 illustrates a flow chart showing the operation of the system and apparatus of the present invention during an intrusion event.

FIG. 10 shows a flow chart 178 for an intrusion event 8. Vehicle key 16 and key tags 74 are electronically assigned to the vehicle 2 and VAM 180. The key tag 74 is checked when the VAM 12 is opened 182, and it is determined whether it is the correct key 184. If "yes", a second determination is made by the server 22 whether the event takes places during normal operating hours 186. If "yes" again, the time that the vehicle 2 is opened is recorded and determined if returned within the maximum demo drive time limit 188. If "yes", the VAM 12 is ready for the next access 208. If the limit is exceeded, then a missing key alert is sent to the management 190, which must be cleared 192 before the VAM is then ready for the next access 208. If the alert is not cleared, an alarm may be sounded or security or police agencies notified.

If the key is not correct, then a missing key alert is sent to the management 190, which must then be cleared 192 before the VAM is ready for the next access 208.

If the key is correct 184, but it is after hours for the dealership 186, the VAM 12 checks in every 5 minutes 194. If the check in is completed 196, the VAM 12 is ready for the next access 208. If the check-in is not completed 196, a missing vehicle alert is sent to management and security 198.

The VAM 12 is equipped with an intrusion sensor 70 which detects disturbance of the module. If an intrusion is detected 200, there is a determination whether it takes place during normal operating hours 202. If yes, a visual alert from the Red LED flashes as a warning 206 and the VAM 12 is ready for the next access 208. Optionally, a Dealer can designate that an alarm be sent even during the day but it is unlikely to be used, since most thefts occur at night. If it is after normal dealer operating hours 202, an Intrusion High Alert is sent to security and management 204, which must be cleared 192 before the VAM is then ready for the next access 208.

Figure 11:
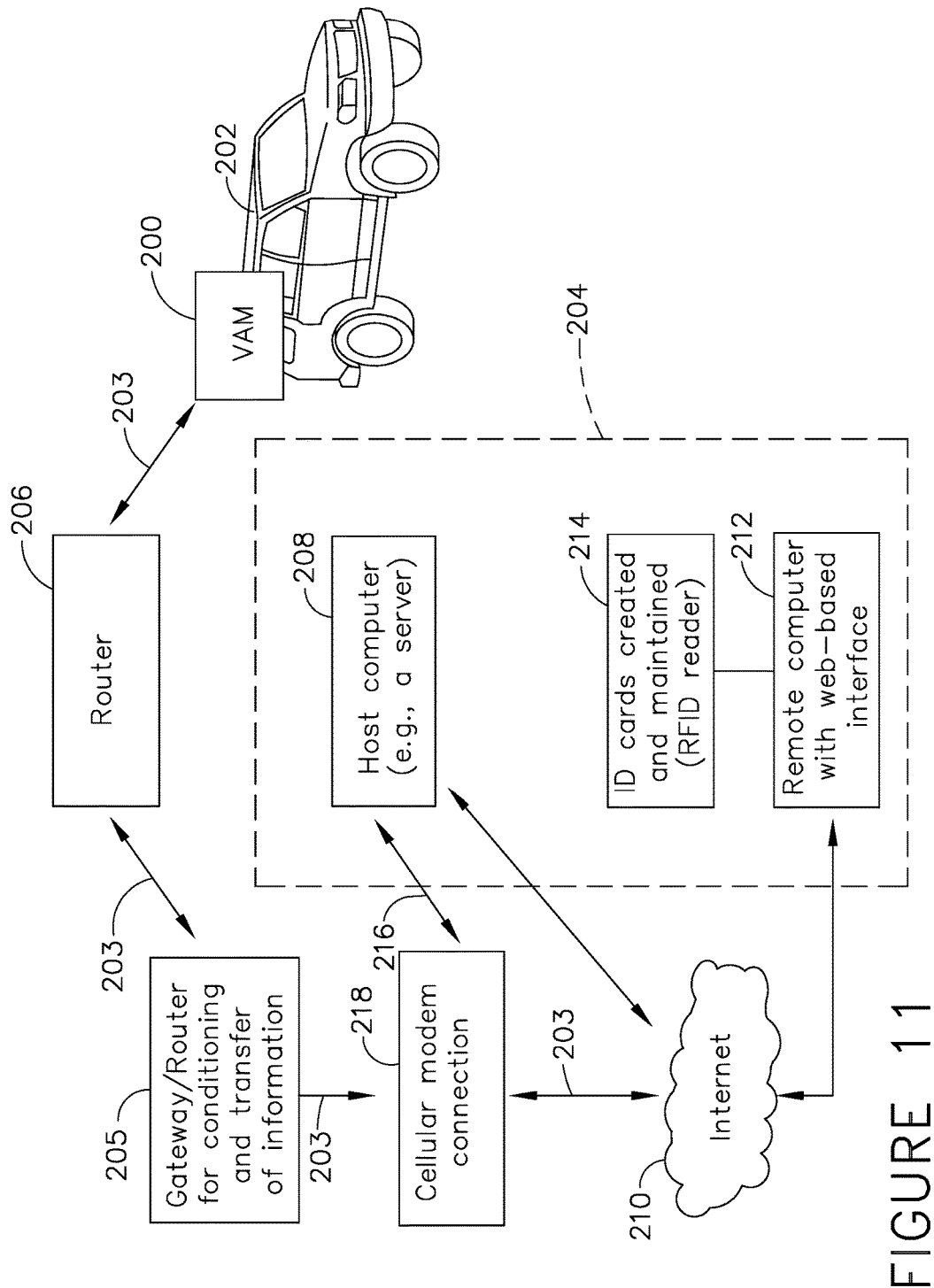
FIG. 11 is a schematic diagram of the configuration of the system and apparatus in accordance with one embodiment of the present invention.

FIG. 11 shows a schematic diagram of a system and method further exemplifying embodiments of the present invention. As shown in FIG. 11, at least one VAM 200 is provided for removable attachment to at least one vehicle 202 and preferably for a plurality of vehicles on a lot.

The VAM 200 is typically connected to a computer system 204 having a database for storage of the information received from the various VAMs 200 during operation through any number of known wireless networks. The computer system 204 further includes systems 214 for creation and management of the identification devices, such as key tags and/or ID cards.

The term computer is used broadly in the context of the present invention and includes any individual computer that is operably connected to the VAMs, whether it be an on-site computer, or any network of computers operably connected to the VAMs. The computer may be a standard desktop or laptop computer, or may also be a server connected to any number of remote computers. The computer system preferably includes a user interface and software that allows for administration of the systems and methods remotely, either on site, or at a remote site to the vehicle lot.

The VAMs 200 are connected wirelessly 203 via at least one wireless router 206 strategically positioned on the lot, although other devices such as repeaters and/or transponders may be employed. The placement and number of routers 206 are typically site-specific and can be modified in any number variations. The routers 206 may be directly connected to the computer system 204, or alternatively may be operably connected to a gateway (or router) 205 that serves to condition the information for distribution to the computer system 204. The computer system 204 includes a host computer 208, such as a server, connected to a network 210, such as the Internet. Any number of remote computers 212 are therefore connectable to the host computer 208 through a web-based browser program.

Suitable wireless networks include Wi-Fi networks, Bluetooth networks, Zigbee networks, cellular networks, and the like. Preferably, the wireless networks employed by the present invention utilize either a Zigbee based wireless network or a cellular network, or both, because of their advantages in power consumption and flexibility in communication with the computer. In the case of Zigbee wireless networks, a significant benefit is provided because this protocol is extremely energy efficient, which provides for significant advantages in designing the VAMs.

The wireless connection to the host computer 208 can be made either through a remote computer 212 on-site that is operably connected to the server, e.g., via the Internet 210. Alternatively, the connection 216 to the host computer 208 is advantageously accomplished via a cellular modem connection 218. The cellular connection 218 is particularly advantageous because it allows for the VAMs 200 to remain in connection with the host computer 208 without regard to the computer systems on-site. Thus, if the computer systems on-site are down, overloaded, or not properly maintained the VAMs remain functional and operational.

The systems and methods according to the present invention further include the use of key identification devices and user identification devices, such as key ID tags, individual ID cards, and the like, that serve to provide secure access to the VAMs and further provide the ability to monitor the keys and locations of the vehicles. These devices further facilitate the logging and monitoring of event information relating to the vehicles, such as whether the vehicle has been accessed and whether the key is present in the VAM. These devices include RFID, magnetic, or biometric cards, tags, or other devices. Systems for creating and coding these devices are preferably placed on site for prompt and easy creation and management of the identification devices. These systems are commercially available and known to those of skill in the art. Examples of these systems include: commercially available fingerprint readers, access cards with magnetic strips and/or bar codes and RFID cards or fobs.

The key identification device is attached to the key of each vehicle and contains information identifying the particular key with the appropriate vehicle (including for example, VIN numbers, make, color, and the like). The user identification device is typically unique to an individual that is authorized to access the vehicles and includes information as to the particular user (including for example, name, position, level of access, or an employee identification number). The information pertaining to the vehicles and the users is also stored on the computer so that it can be updated to the machines to actively promote management of access, security to the vehicles, and monitoring of inventory.

The VAM includes a storage device capable of receiving and storing data, a wireless transmitter, at least one sensor, a releasable key container configured to receive at least one key, and a processor. The VAM further includes an efficient rechargeable battery, preferably a solar charged battery.

The storage device may be any known storage device known to those in the art. Suitable storage devices include internal RAM storage devices, and may also include other forms of memory storage, including flash memory devices.

Wireless transmitters suitable for use in the present invention are also known to those of ordinary skill in the art. Suitable wireless transmitters include those used in connection with wireless home automation systems that connect appliances, heating and air conditioning, lights, with hand held control panels.

The sensors can be any number of sensors depending on the particular application. Suitable sensors for reading information from the identification devices include an RFID readers, magnetic strip readers, biometric readers, and keypads. The sensors may also include intrusion sensors that detect disturbances with the VAM or the vehicle, such as attempts to tamper with the VAM or to break into the vehicle. The sensors are capable of receiving and transmitting information received from the identification devices or from disturbances to the storage device. The sensors are advantageous because they allow, not only for the monitoring of authorized access to the VAMs but further provide for the ability to capture valuable event information, such as customer phone numbers, names, addresses, and the like, that is in turn utilized in generating reports, marketing effectiveness information, sales campaign information, sales follow-up information, and alarms.

The VAM further includes a processor that is programmed to access and analyze the event information and compare the event information to reference information stored in the storage device for initiation of actions dictated by the identification devices. These events include, for example, triggering an alarm, releasing the releasable key container, and transmitting the event information to the computer.

The releasable key container includes a solenoid that activates to open the container upon receipt of verified access of the identification devices. Preferably, the key container opens only a portion upon the triggering event and is opened the rest of the way by the user. The VAM is capable of transmitting information pertaining to the status of the releasable key container to the storage device for further identification of the status of the vehicle key. If the container remains open, or the key is missing, for a predetermined period of time, the VAM may transmit a warning signal to the computer. Upon closure of the container, information may again be transmitted thereby storing a period of time the key was removed from the VAM. Alternatively, the sensors are capable of sensing when, and for how long, the key was removed from the VAM.

The VAM is preferably configured to allow for autonomous operation for extended periods of time, without requiring access to the computer for verifying event information such as whether the user is authorized to access the vehicle.

Figure 12:
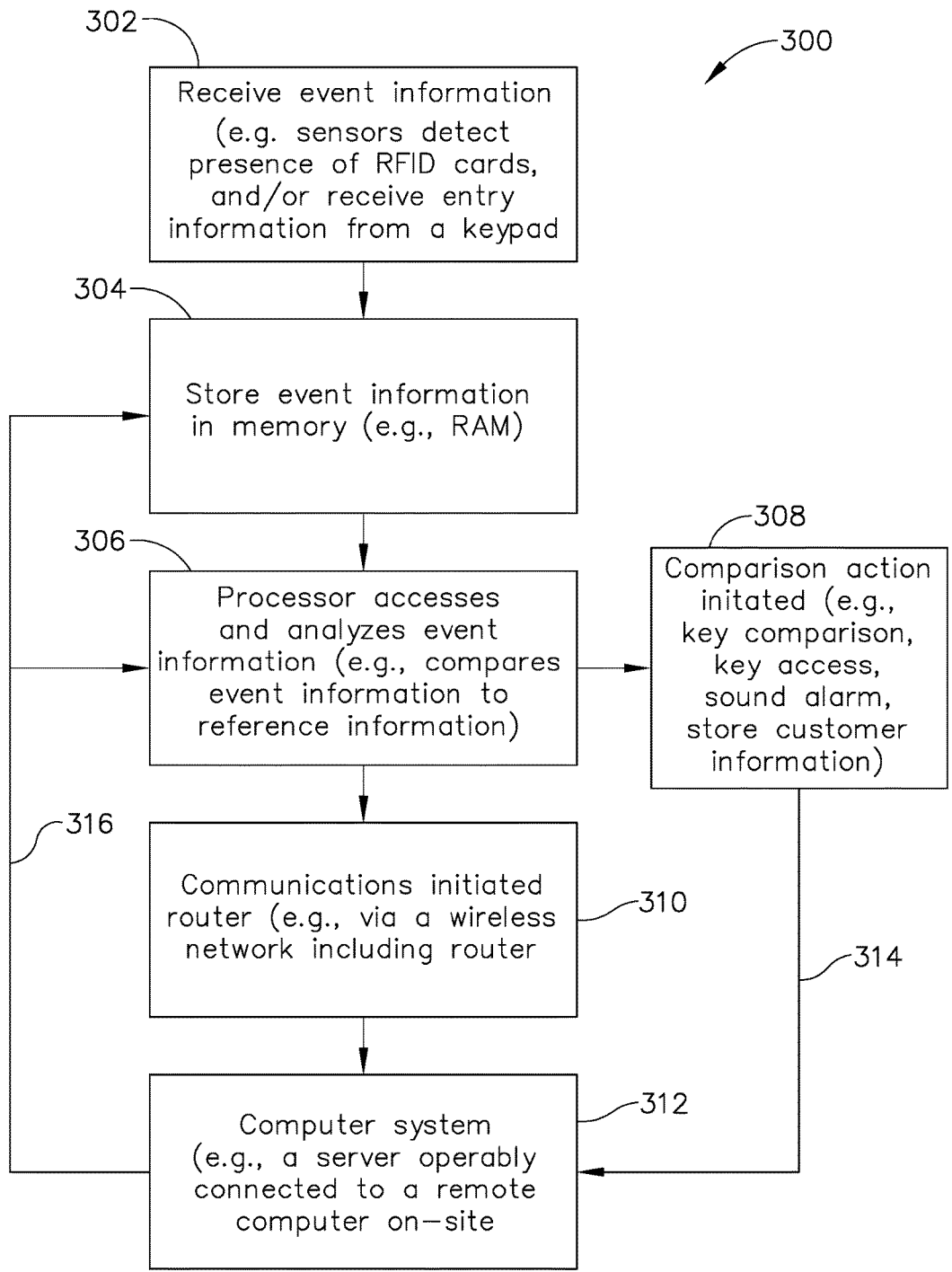
FIG. 12 illustrates a flow chart showing the operation of the vehicle activity module in accordance with one embodiment of the present invention.

FIG. 12 identifies a flow diagram exemplifying the operation 300 of one embodiment of the VAM operably connected to a computer system. Initially, the VAM receives event information 302 from the sensors. This event information is often provided, at least in part, by the key or user identification devices. Event information may also be advantageously provided through other devices, such as user interaction with a keypad. The event information is then stored 304 in a storage device within the VAM. Information in addition to key or user identification information, such time of access may also be associated with the event information.

Once the event information is stored 304 in the storage device, a programmed processor accesses and analyzes the event information. The processor then initiates either: an action based on the event information 308; or communication 310 with the computer system 312 via, for example, a wireless router. For example, in the instance where the event information is related to access to the VAM, the processor initiates the opening of the releasable key container. The processor may be programmed to initiate any number of actions in response to event information and may preferably compare event information to reference information stored in the storage device 314. The information relating to the action initiated may further be transferred 314 to the computer system 314 for storage and analysis.

The VAM processor also initiates communication 310 with the computer system via the wireless connection. This communication may be programmed to occur at periodic intervals, e.g., once a day, or may be programmed to occur based on event information. The communication 310 with the computer system 314 serves to allow the VAM to obtain and maintain updated reference information relating to event information and further to provide the stored information, for example, information relating to sales events, non-sales events and intrusion events, without querying the computer each time event information is received. In this instance, the reference information used to verify information received by the VAM from the sensors is downloaded 316 onto the VAMs from the computer 312 independent of any event information being sensed. This autonomous operation provides the significant advantages of decreased power consumption and the ability to operate in the event the on-site computer systems are down or to be used remotely at a paint shop, tire shop, or at a shopping center sale, or tent sale.

Figure 13:
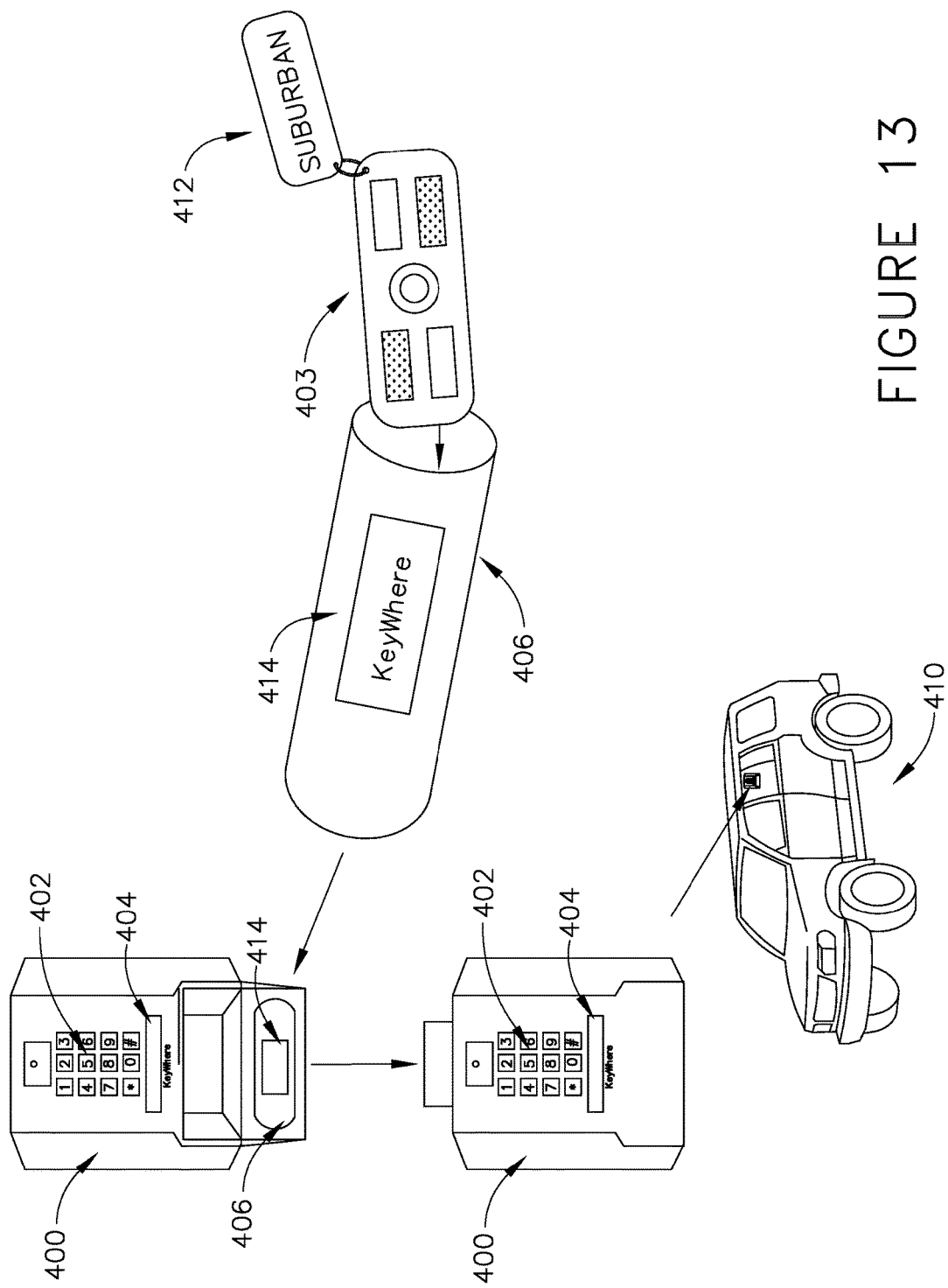
FIG. 13 is a schematic diagram of a vehicle activity module having a conductive container for housing a "smart key" that may interfere with operation of the system and/or the vehicle activity module.
Figure 14:
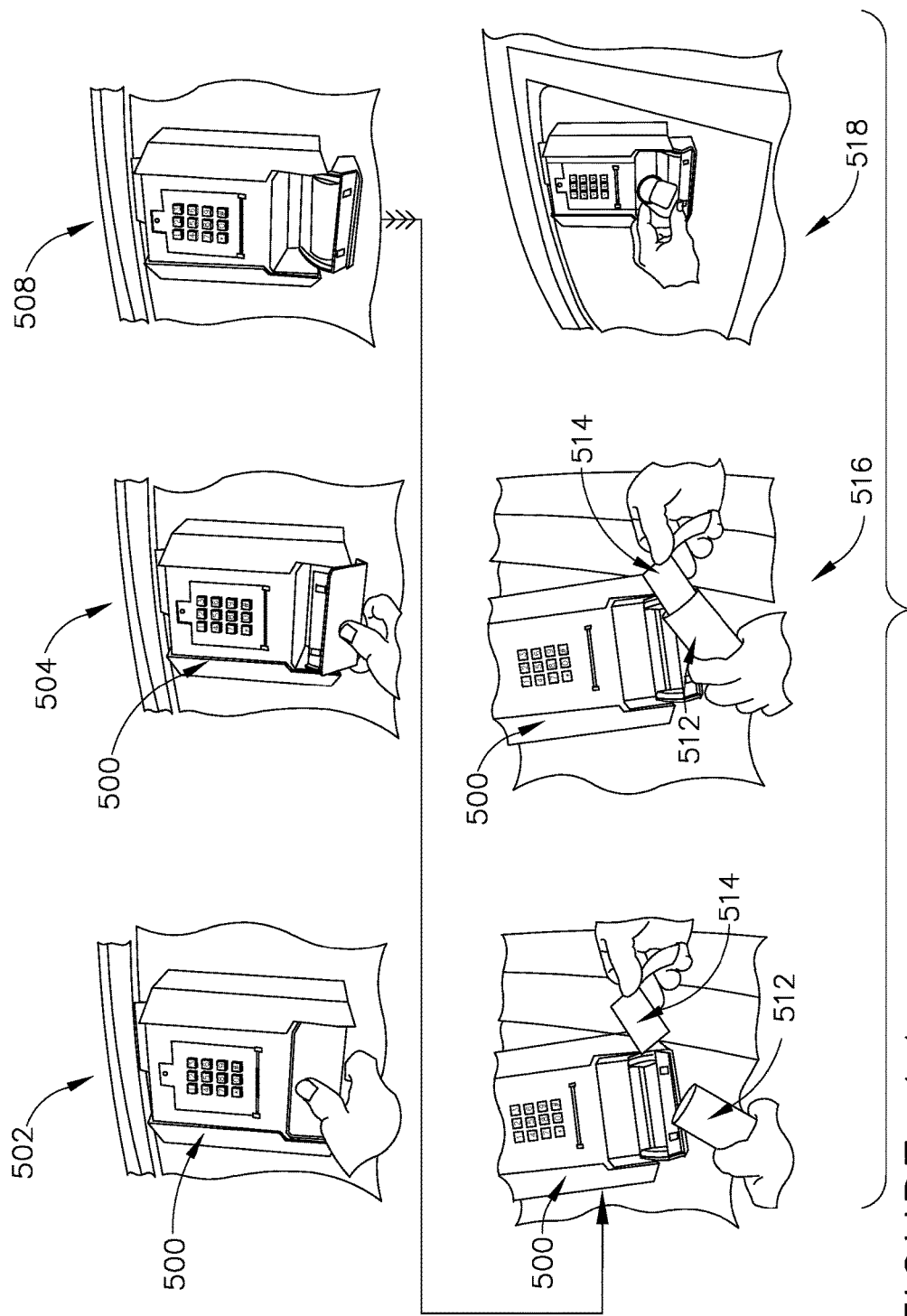
FIG. 14 is a flow chart showing the sequence of steps for accessing and returning a smart key in accordance with one embodiment of the present invention.

FIGS. 13 and 14 show a VAM 400 in which at least one of the sensors is a keypad system 402 for information entry and access. The keypad system 402 may be used in addition to, or in place of, a magnetic card reader 404 or RFID reader (not shown). The keypad system 402 provides further additional benefits for the VAM 400 and related systems. The keypad system 402 allows for the entry and capture of important customer information, including contact information such as a telephone number, to be entered by the employee at the time the key is accessed. This information can then be sent to the computer system for use by employees, sales personnel, management, and the like. This information can be sorted, stored, and accessed by the system for further analysis and reporting. In addition, the keypad 402 provides redundancy and additional security. One example of the added security includes the management of access to the VAM 400 by use of employee pin numbers, or access numbers. These access numbers may be numbers assigned to a particular employee, or may be a predetermined number used by any or all given VAMs 400 at a particular time, e.g., a daily access number or a revolving access number similar to those used in connection with RSA SecurID™ systems. Inclusion of both a magnetic 404, RFID (not shown), or other entry device, and pin or access numbers thereby provides an additional level of security should an unauthorized individual obtain access to a card. Suitable keypads 402 include commercially available programmable keypads. Preferably, the keypads, as well as the VAM housing, are manufactured to withstand the harsher environmental conditions they will be subjected to during use in automobile lots, including, for example, moisture, and excessive hot or cold weather.

In another embodiment, the VAM 400 is configured to require two forms of identification prior to granting access. For example, in the instance where the VAM 400 includes a keypad sensor 402 and an RFID sensor (not shown), the VAM 400 can be configured to require both recognition of the user's RFID identification card as well as entry of information into the keypad 402. Alternatively, the user may be required to enter the potential customer's telephone number into the key pad 402, or another predetermined code. This provides additional security advantages in the instance where an unauthorized user may attempt to use someone's RFID card. Additionally, the requirement of entering the customer's phone number captures vital information enabling dealers to follow up with customers interested in purchasing cars.

As shown in FIG. 13, the VAM 400 may also include a conductive, or signal attenuating, container 406, which serves to accommodate "smart keys" 403 into the VAMs 400. Generally, smart keys 403 include use of a wireless RFID to signal the appropriate vehicle to unlock when the door handles are pulled, and the smart key 403 is within a few feet of the vehicle 410. In addition, the smart key 403 allows the vehicle 410 to be started and operated by having the key 403 in the proximity of a sensor in the area of the vehicle front seat. Smart keys provide new obstacles and issues for the management of keys. Attenuating the smart key signal may be necessary in order for the VAM 400 to store the smart key 403 while simultaneously preventing access to the vehicle 410. Attenuating, or blocking, means impeding or inhibiting the wireless signal sufficiently such that the wireless signal does not achieve its intended function.

Attenuating the smart key 403 signal is preferably accomplished through use of a conductive housing, e.g., a Faraday cage. The conductive housing is an enclosure formed by conducting material, or by a mesh of such material. Such an enclosure blocks out external static electrical fields. In operation, the electrical charges in the conductive housing repel each other and will therefore always reside on the outside surface of the conductive housing. Any external electrical field will cause the charges to rearrange so as to completely cancel the field's effects in the housing's interior. Faraday cages also shield the interior from external electromagnetic radiation if the conductor is thick enough and its meshes, if present, are significantly smaller than the radiation's wavelength. A Faraday cage generally includes a metallic housing, or enclosure, that prevents the entry or escape of an electromagnetic (EM) field. Exemplary Faraday cages include a solid tubular, rectangular, or other appropriately shaped container with one open end. The material of the cage is preferably metallic, but could be any other similar conductive material that prevents entry or escape of an EM field. It may also be made of a mesh of a conducting material. The signal attenuating housing may be a separate component of the VAM or integral to the VAM housing, provided the structure is sufficient in composition and shape to prevent the "smart key" from communicating with the automobile while it is within the VAM or the signal attenuating housing. Alternatively, the signal may be attenuated through temporary disablement of the smart key signal, as is possible with a number of smart keys, or through other known devices or methods.

FIG. 13 shows a smart key 403 having a dealership vehicle ID tag 412 attached thereto. A conductive container 406 is also provided to prevent communication between the smart key 403 and the automobile 410 while the key 403 is present within the conductive housing 406. This conductive container 406 is preferably semi-permanently attached to the key 403 so that it is not inadvertently separated from the key 403. A RFID tag 414 is appended to the outside of the conductive container 406, which then allows for verification of the presence and location of the conductive container 406, and accordingly the key 403. In use, the smart key 403 is stored within the conductive container 406, which is then stored within the key storage portion of the VAM housing. Access to the VAM 400 is then achieved through one of the keypad 402, ID reader 404, or RFID reader (not shown). The presence of the key 406 within the conductive container 406 thus does not interfere with access to the VAM 400 and storage of related data, nor does the key 403 affect access to the vehicle 410 until it is removed from the container 406.

FIG. 14 shows an example of sequential steps for accessing a smart key in accordance with this embodiment of the present invention. At step 502 the user provides identification information (e.g., via a RFID card, and/or a pin or access number). The VAM 500, upon validation of the information provided, at step 504, grants access to the releasable key container. Preferably, the releasable key container opens only part way, requiring the user to manually assist the full opening of the releasable key container, as shown in step 508. Next, the conductive housing 512, which contains the key 514, is removed. Once the particular event is completed, the key 514 is returned to the conductive housing 512 at step 516. The conductive housing and key are then returned to the VAM at step 518.

Other features and embodiments include an inventory management system for a plurality of vehicles having a plurality of vehicle activity modules, each including an identification number to uniquely identify the vehicle activity module, a wireless transmitter, an activity sensor, a key container to receive a key, and a key sensor to monitor the presence of a key in the key container. The inventory management system further includes a host computer, or central computer in communication with each of the transmitters of said plurality of vehicle activity modules; and a plurality of access ID cards having unique identification numbers for accessing a key contained in a vehicle activity module. The activity sensor reads a unique identification number of one of the plurality of access ID, verifies that the access ID card is authorized to have access to the key in the key container, and then permits access to the key container so that the key may be removed to operate a vehicle. The inventory management system further includes a device, such as a keypad, to allow a user to enter a personal identification number which is then cross-referenced against, or stored in, a database within the VAM.

The inventory management system may further provide confirmation when the access ID card has been activated. The confirmation may be a visible light, a bell sound, a beeping sound, a flashing light, a green light, a recording of the words "thank you," and combinations thereof. The inventory management system may required a confirmation signal from at least one of the following: a bio-informatics sensor that confirms that the person attempting to activate the access ID card is a person who is authorized to possess the access ID card; and a speech recognition sensor that confirms that the person attempting to activate the access ID card is a person who is authorized to possess the access ID card.

The inventory management system may also include a second key sensor that determines whether a key that is placed in the key container of the predetermined vehicle activity module is a key that is designed to operate the vehicle to which the predetermined vehicle activity module is attached, and wherein the system computer utilizes the database to track the identity of keys that are placed in at least one vehicle activity module. Thus, for keys that include their own signaling ability, these keys may be used in place of requiring a separate key tag.

The inventory management system may also include a plurality of key tags, each of which is configured to attach to a vehicle key. The key tag has a unique key tag identification number which is used to identify the key to which it is attached; and the second key sensor detects a unique key tag identification number to determine whether the key to which one of the plurality of key tags is attached is a key that is designed to operate the vehicle. The inventory management system.

In another embodiment, the system computer of the inventory management system sets a flag when the activity sensor permits access to the key container containing a key, and if the key sensor does not detect the return of the key within a predetermined time period, the system computer activates the alarm to indicate that the key has not been returned, wherein the alarm is selected from the group consisting of: an audio alarm on the vehicle whose key has not been returned; an electronic mail notification to a predetermined email address; an electronic notification delivered via a cell phone; and combinations thereof.

In another embodiment, the inventory management includes a user interface program that permits an authorized user to run queries on information contained in the database. The user interface program may be located either within the VAM or at the central, or system, computer. The user interface may be configured to be accessed from a location remote from the system computer by either a local area network or the Internet. The user interface program may further be configured to receive input from a user, e.g. a vehicle description, and the interface program will generate a report to the user which identifies a location where a vehicle matching the input description may be found. Alternatively, the user interface program may allow for receipt of other input from users, such as queries relating to access ID cards, or authorized users. In such an example, the activity sensor compares the unique identification number of one of the plurality of access ID cards to a downloaded list of authorized users to determine that the access ID card is authorized to have access to the key in the key container, and then permits access to the key container so that the key may be removed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements.

As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

INDUSTRIAL APPLICABILITY

The present Vehicle Activity Module system 10 is well suited for application in providing security, tracking and managerial information.

Car dealers were consulted as to what features were desirable to improve security and inventory control and their responses were used as a basis for this invention. These features included the need for use on both used and new vehicles to provide information on whom, when, how long and why they were accessed. They wanted the key available on the car, wanted the system to be intuitive, react in real time, have tamper controls, and able to provide the status on demand for inventory, key and theft control by providing basic reports. A sensor for the key container was desired, and the system should require low maintenance.

Due to the recent advancements in products for wireless communications, all weather RFID card readers, and solar assisted battery technology, the components are available from off the shelf making this invention possible at a reasonable cost. Each time a sales consultant opens a vehicle for customer showing, a sales event will be launched when the sales consultant's ID is validated after passed through the VAM reader. If the ID is approved the key container will immediately be accessible. This event will continue to be open until terminated by replacing the key and closing the VAM key container. A system alert will be generated if closure is not achieved in a reasonable period of time (as fixed by dealer policy).

The second event will be a non-sales and non intrusion event such as vehicle cleaning, moving the vehicle to a different location, and the vehicle being taken out of inventory by sale, trade, auction, or other assignment.

Third, will be any event that is interpreted by the internal VAM sensors and tampering, referred to here as an intrusion event. Sensitivity to normal events will not generate an alarm. However, the shock sensor in the VAM can be turned up in off hours by the central system, to attack any minor tampering in off hours. Web access will be provided for authorized persons to remotely access reports, inventory data, system status, VAM status, software support, software enhancements, and authorized third party access. Intrusion detection and alerting will be integrated with each VAM. If there in an unauthorized attempt to remove or tamper with the VAM when the dealership is closed, the VAM sensors will detect this tampering and signal, brightly flash the red led and at the same time an alarm will be sent immediately go to a dealer designated security service and/or to dealer management If for any reason the VAM is unable to communicate the alarm to the VAM System, a missing vehicle alarm will be sent out 5 minutes later when the VAM fails to check-in.

In addition, and with dealer consent, demand and fulfillment information may be aggregated and made available to the vehicle manufacturers. This data could be used to improve the production planning and possibly return on assets by the manufacturers by improving the accuracy of matching vehicle production to the most current demand, with the possibility of benefiting all parties while protecting the best interest of the dealers.

This invention is the first real-time data authorization process to capture the all inventoried dealer vehicle access events "on the spot" and to therefore insure access accountability. Key elements of this invention are as follows:

1. Wireless device that is hooked over the window of each vehicle in inventory. This device is termed the "Vehicle Activity Module" or VAM. The VAM will utilize a personalized magnetic card and a reader similar to a bankcard and each authorized cardholder will have a unique identifier.

2. Antennas typically will be located on the dealership roof or light poles and provide a clear path to communicate with all Vehicle Activity Modules. Multiple VAM's can communicate with a single antenna simultaneously. VAM access to the antennas does not have to be line of site as wireless is designed to be used in buildings as well and will penetrate walls and windows. Each antenna will relay the information to a central computer typically located in the dealership phone and network equipment room.

3. The dealer VAM database will preferably consist of a standard PC with a Microsoft relational database, which will provide validation in real-time, prior to any authorized vehicle access. With a validated card the VAM will present the vehicle key and record this event.

4. When the vehicle activity is completed (within a reasonable period of time), the key will be returned to the VAM and the event terminated by closure of the VAM with the vehicle key replaced in the specially designed releasable key container. Each step will be recorded in the data base and the VAM is ready for the next access. If the vehicle key is a "smart key" then it is inserted into the "smart key" signal attenuating container before placing in the VAM and closing the chamber. The electronically assigned RFID key tag is attached to the top of sleeve and both are tethered to the "Smart Key" as in FIG. 11.

5. When each Authorized Access cardholder arrives for the day they will quickly "activate" their ID at a station near the showroom. This will help insure that the individual is present at that time and in possession of their assigned ID card. This notification event is required to allow any specific card to be a valid for that day or until that specific card is suspended.

6. From time to time during the day and in between sales events each Sales Consultants can easily add comments and customer contact details to the activity report at any dealership.

7. New or emergency cards can be issued as required by the appropriate person with access to the authorization application.

8. There will be three standard reports generated by the VAM System that can get scheduled or generated as required:

Sales Activity Report summary by Sales Consultant;

Vehicle Activity Report with alerts for action based on individual dealer policy; and VAM Status report for maintenance actions.

9. There will be one or more additional applications available to each dealer, which will provide a managerial, user friendly "dash board" for past vehicle sales analysis and future inventory planning. The activity information history contained in the data base (actual sales by vehicle group, by margin, by feature group, by price, by color, promotions, competitive moves, and other factors, as defined by each dealer), will be used for projecting inventory replenishment requirements.

Pre-Installation planning required Detailed Site Survey to create a commercial level custom wireless infrastructure blueprint Installation approved, directed, and tested.

Installation includes computer system/access points and antennas (typical installation will have 4 to 10 antennas connected to one server).

Installation and Vehicle Data Loading Detailed Vehicle Data is automatically loaded nightly on the VAM server from the dealers DMS (dealer management system—typically ADP or Reynolds & Reynolds). Installation of the VAM System is a few administrative set up screens.

ID Cards created at the dealership Individual ID cards are issued to sales, management, service, lot porters, and special vendors. The system provides tracks a daily pass ID when needed so that there is no need to borrow. The general manager will keep some master ID cards in event an emergency. A master card gives immediately opens any VAM lockbox.

Sales Event Sales person activates VAM and obtains the vehicle key. Sales person optionally enters customer information, such as a phone number. Shows vehicle to customer. Demo Drive is captured if applicable. Key is replaced and event is closed. Daily comments into any and every sales event can easily be quickly (pre-defined check boxes plus comment block) be captured. Non Sales event Vehicles are accessed constantly for non-sales reasons. There are 2.times. daily accesses for non-sales events. Vehicles can get stuck in vendor locations where there are service/repair needs. The system highlights vehicles that are in inventory and have no/few sales events The core of the VAM System is the lockbox integrated with a custom designed wireless infrastructure (every dealership is different) and the management software to make key access and accountability dealership super simple.

The present invention uses a system where the VAM is in a light sleep mode with the ability to react in milliseconds to any interrupt (disturbance/request for access). There is no concept of a roll call but each VAM asks for attention when needed, including waking up at programmed (and controllable) intervals such as every 30 minutes during business hours and every 5 minutes at night so that there is an AWOL/MIA fall back to generate an alert. This avoids the problems involved in using a pulse generator, which must constantly listen for a "roll call" and thus expends battery power quickly.

VAM access control to keys sets Access to keys granted or denied in real time. Access locked out after hours except for master cards. All users identified and tracked. Access key is electronic (RFID) and encrypted to avoid copying. Each key set also has an RFID tag for tracking with each access and return.

Power Source—always available and independent power sources are required to secure the car. Regulated power to keep the electronics operational Renewable energy source with daily solar re-charge of the battery pack Battery strength reported every few minutes for advanced notice if a failing battery. Battery packs are easily replaceable by the dealer.

Real time wireless tampering alerts Vehicle specific (by vehicle description & VIN) immediately reported to security surveillance center. Same information can be also be sent immediately to cell phone(s) as an urgent message. Same information is also sent by email. VAM units not reporting in at regular (5-minute) time interval will generate an immediate alarm as a fail safe.

For the above, and other, reasons, it is expected that the vehicle activity module system of the present invention will have widespread industrial applicability. Therefore, it is expected that the commercial utility of the present invention will be extensive and long lasting.

What is claimed is:

1. An electronic lockbox for storing a key proximate a remote location, said electronic lockbox comprising:
   a computer circuit, a memory circuit, an automatically-controlled electronic lock, and a user identifier circuit;
   a housing having a first portion and a second portion, said first portion acting as a cover and said second portion acting as a key container, said key container being lockable in a first operating mode and being releasable in a second operating mode, under control of said computer circuit;
   wherein:
   (a) said housing first portion is made of an electrically conductive material;
   (b) said housing second portion is made of an electrically conductive material;
   (c) if locked in said first operating mode, said housing becomes a secure enclosure that is sized and shaped to contain a remote location key;
   (d) if locked in said first operating mode, said housing is physically sized and shaped such that said first and second portions are closed together to enclose an internal space, and then comprises a Faraday cage that attenuates a wireless signal emitted from said remote location key when disposed within said Faraday cage; and
   (e) if released in said second operating mode, said housing is physically sized and shaped such that said first and second portions are separable so an authorized user may obtain physical access to said remote location key, and if in said released second operating mode, said housing does not comprise a Faraday cage.

2. The electronic lockbox of claim 1, wherein said secure enclosure is integral to said electronic lockbox.

3. The electronic lockbox of claim 1, wherein said secure enclosure comprises a solid metallic housing.

4. The electronic lockbox of claim 1, further comprising: a wireless transmitter by which event information can be transmitted to a separate computer for storage and analysis; and wherein, said wireless transmitter continues to operate whether said first and second portions of the housing are closed together in said first operating mode, or are separated in said second operating mode.

5. The electronic lockbox of claim 4, wherein said wireless transmitter is configured to communicate with said separate computer through a cellular communications facility.

6. The electronic lockbox of claim 1, further comprising an identification tag which is attached to and associated with one of: (a) said remote location key, and (b) said secure enclosure.

7. The electronic lockbox of claim 6, wherein said identification tag is an RFID tag.

8. The electronic lockbox of claim 1, wherein said computer circuit and said memory circuit all continue to operate, and said user identifier circuit is accessible, whether said first and second portions of the housing are closed together in said first operating mode, or are separated in said second operating mode.

9. The electronic lockbox of claim 1, wherein said first portion and said second portion are physically reusable, such that:
   (i) after said housing has been locked in said first operating mode; then
   (ii) after said housing has been released in said second operating mode, said Faraday cage characteristics are still intact; and then
   (iii) if said housing is locked again by closing together said first portion and said second portion, then said internal space again comprises a Faraday cage.

10. An electronic lockbox for storing a key proximate a remote location, said electronic lockbox comprising:
    a computer circuit, a memory circuit, an automatically-controlled electronic lock, and a user identifier circuit;
    a housing having a first portion and a second portion, said first portion acting as a cover and said second portion acting as a key container, said key container being lockable in a first operating mode and being releasable in a second operating mode, under control of said computer circuit;
    (a) said housing first portion is made of an electrically conductive material;
    (b) said housing second portion is made of an electrically conductive material;
    (c) if locked in said first operating mode, said housing becomes a secure enclosure that is sized and shaped to contain a remote location key;

(d) if locked in said first operating mode, said housing is physically sized and shaped such that said first and second portions are closed together to enclose an internal space, and then comprises an electromagnetically shielded container that attenuates a wireless signal emitted from said remote location key when disposed within said electromagnetically shielded container; and (e) if released in said second operating mode, said housing is physically sized and shaped such that said first and second portions are separable so an authorized user may obtain physical access to said remote location key, and if in said released second operating mode, said housing does not comprise an electromagnetically shielded container.

11. The electronic lockbox of claim 10, wherein said secure enclosure is integral to said electronic lockbox.

12. The electronic lockbox of claim 10, wherein said secure enclosure comprises a solid metallic housing.

13. The electronic lockbox of claim 10, further comprising: a wireless transmitter by which event information can be transmitted to a separate computer for storage and analysis; and wherein, said wireless transmitter continues to operate whether said first and second portions of the housing are closed together in said first operating mode, or are separated in said second operating mode.

14. The electronic lockbox of claim 13, wherein said wireless transmitter is configured to communicate with said separate computer through a cellular communications facility.

15. The electronic lockbox of claim 10, further comprising an identification tag which is attached to and associated with one of: (a) said remote location key, and (b) said secure enclosure.

16. The electronic lockbox of claim 15, wherein said identification tag is an RFID tag.

17. The electronic lockbox of claim 10, wherein said computer circuit and said memory circuit all continue to operate, and said user identifier circuit is accessible, whether said first and second portions of the housing are closed together in said first operating mode, or are separated in said second operating mode.

18. The electronic lockbox of claim 10, wherein said first portion and said second portion are physically reusable, such that:
(i) after said housing has been locked in said first operating mode; then
(ii) after said housing has been released in said second operating mode, said electromagnetically shielded container characteristics are still intact; and then
(iii) if said housing is locked again by closing together said first portion and said second portion, then said internal space again comprises an electromagnetically shielded container.

19. An electronic lockbox for storing a smart key proximate a remote location, said electronic lockbox comprising:
a computer circuit, a memory circuit, an automatically-controlled electronic lock, and a user identifier circuit;
a housing having a first portion and a second portion, said first portion acting as a cover and said second portion acting as a key container, said key container being lockable in a first operating mode and being releasable in a second operating mode, under control of said computer circuit;
wherein a combination of said housing first portion and said housing second portion comprise a secure enclosure that is sized and shaped to receive a smart key, said smart key including a first wireless communication circuit, in which:
(a) said secure enclosure is openable for use in said second operating mode so an authorized user may obtain physical access to said smart key;
(b) said secure enclosure is closeable for use in said first operating mode, and (i) if said secure enclosure is closed and locked, then (ii) it comprises a physical structure that (A) is electrically conductive in composition and (B) is an electromagnetically shielded container that attenuates a wireless signal emitted from said smart key when said smart key is disposed within an internal space of said electromagnetically shielded container; and
(c) if opened in said second operating mode, said secure enclosure does not comprise an electromagnetically shielded container.

20. The electronic lockbox of claim 19, wherein said secure enclosure is integral to said electronic lockbox.

21. The electronic lockbox of claim 19, wherein said secure enclosure comprises a solid metallic housing.

22. The electronic lockbox of claim 19, further comprising: a second wireless communication circuit in said lockbox by which event information can be transmitted to a separate computer for storage and analysis; and wherein, said wireless transmitter continues to operate whether said first and second portions of the housing are closed together in said first operating mode, or are separated in said second operating mode.

23. The electronic lockbox of claim 22, wherein said second wireless communication circuit is configured to communicate with said separate computer through a cellular communications facility.

24. The electronic lockbox of claim 19, further comprising an identification tag which is attached to and associated with one of: (a) said smart key, and (b) said secure enclosure.

25. The electronic lockbox of claim 24, wherein said identification tag is an RFID tag.

26. The electronic lockbox of claim 19, wherein said computer circuit and said memory circuit all continue to operate, and said user identifier circuit is accessible, whether said first and second portions of the housing are closed together in said first operating mode, or are separated in said second operating mode.

27. The electronic lockbox of claim 19, wherein said first portion and said second portion are physically reusable, such that:
(i) after said housing has been locked in said first operating mode; then
(ii) after said housing has been released in said second operating mode, said characteristics for preventing said smart key from wirelessly communicating with an external electronic circuit are still intact; and then
(iii) if said housing is locked again by closing together said first portion and said second portion, then said internal space again comprises said structure that is electrically conductive in composition and prevents said smart key from wirelessly communicating with an external electronic circuit.

* * * * *